(12) United States Patent
Chiu et al.

(10) Patent No.: US 7,724,949 B2
(45) Date of Patent: May 25, 2010

(54) ADVANCED CHROMA ENHANCEMENT

(75) Inventors: Chinchuan Andrew Chiu, San Diego, CA (US); Xiaoyun Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1184 days.

(21) Appl. No.: 11/136,979

(22) Filed: May 25, 2005

(65) Prior Publication Data

US 2005/0275736 A1 Dec. 15, 2005

Related U.S. Application Data

(60) Provisional application No. 60/579,113, filed on Jun. 10, 2004.

(51) Int. Cl.
*G06K 9/00* (2006.01)
(52) U.S. Cl. ........................ 382/167; 382/274
(58) Field of Classification Search ................ 382/162, 382/167, 274; 358/518, 520; 348/222.1, 348/223.1, 224.1, 225.1, 649, 651
See application file for complete search history.

(56) References Cited

U.S. PATENT DOCUMENTS

| | | | |
|---|---|---|---|
| 5,181,105 A | 1/1993 | Udagawa et al. | |
| 5,412,491 A | 5/1995 | Bachar | |
| 6,459,449 B1 * | 10/2002 | Juen | 348/223.1 |
| 6,678,407 B1 | 1/2004 | Tajima | |
| 6,963,362 B1 * | 11/2005 | Nakayama | 348/224.1 |
| 7,215,366 B2 * | 5/2007 | Mori et al. | 348/223.1 |
| 7,231,085 B2 | 6/2007 | Aotsuka | |
| 2003/0164828 A1 | 9/2003 | Hung | |
| 2003/0176281 A1 | 9/2003 | Hultgren | |

FOREIGN PATENT DOCUMENTS

EP 1231565 6/2002

OTHER PUBLICATIONS

International Search Report—PCT/US05/019784—International Search Authority, European Patent Office—Oct. 27, 2005.
Written Opinion—PCT/US05/019784—International Search Authority, European Patent Office—Oct. 27, 2005.
International Preliminary Report on Patentability—PCT/US05/019784—The International Bureau of WIPO—Geneva, Switzerland—Dec. 14, 2006.

* cited by examiner

*Primary Examiner*—Phuoc Tran
(74) *Attorney, Agent, or Firm*—George C. Pappas; Espartaco Diaz Hidalgo

(57) ABSTRACT

To improve the color performance, disclosed herein are advanced methods for improving chroma accuracy, by reducing the color difference between reproduced colors and human perceptual responses, as well as enhancing preferred colors. Chroma enhancement may be performed by selecting one of a plurality of chroma enhancement matrices (CEM), and converting a received color by multiplying it with the chroma enhancement matrix (or a matrix comprising the CEM). The matrix may be selected by mapping a received color value into a region and selecting the corresponding chroma enhancement matrix (or alternately, the corresponding parameters, from which color conversion may be performed). Additionally, enhancement may be adjusted for a variety of environments or preferences. For example, one of a plurality of sets of matrices may be selected in accordance with a desired mode. Optimization techniques for determining the desired chroma enhancement matrices for one or more modes are disclosed. Various alternate embodiments and aspects are also disclosed.

57 Claims, 17 Drawing Sheets

ADVANCED CHROMA ENHANCEMENT

CLAIM OF PRIORITY UNDER 35 U.S.C. §119

The present Application for Patent claims priority to Provisional Application No. 60/579,113 entitled "System and method for Reducing Access Delay in a CDMA Communication System," filed Jun. 10, 2004, and assigned to the assignee hereof and hereby expressly incorporated by reference herein.

BACKGROUND

1. Field

The present invention relates generally to communications, and more specifically to advanced chroma enhancement.

2. Background

Digital cameras are widely deployed and well known in the art. Because of differences between the spectral responses of human eyes and those of camera sensors and/or displays, colors obtained by a camera may differ from those perceived by humans. Image processing techniques are also known for converting image data between various color formats, and for performing various enhancements and modifications to the originally captured image. Color conversion techniques are known for normalizing image data to better represent the original source image when output to various displays. Color conversion matrices for converting the Red, Blue, Green (RGB) color space to component color space ($YC_bC_r$) are known. However, known techniques are limited in their flexibility for color conversion. Furthermore, it is desirable to modify color conversion to compensate for differing environments (such as lighting conditions) as well as user preferences. There is therefore a need in the art for advanced chroma enhancement for more flexible color conversion for enhanced color conversion and adapting to environment conditions and user preferences.

SUMMARY

According to one aspect, an apparatus is described which includes means for generating a plurality of matrices and means for chroma enhancement of a color in accordance with one of the plurality of matrices selected in response to the color.

According to another aspect, an apparatus is described which includes a memory for storing a first plurality of matrices, each matrix associated with one or more sets of coordinates, and a processor for receiving a color value in a first color format, the color format comprising at least one set of coordinates, the set of coordinates comprising two or more coordinate values, selecting one of the first plurality of matrices, the selected matrix associated with the coordinates of the received color value, and converting the received color value to a second color format using the selected matrix.

According to another aspect, an apparatus is described which includes a selector for receiving a color in a first format comprising a plurality of values and selecting one of a plurality of first matrices in accordance with one or more of the plurality of values of the color in the first format, and a multiplier for multiplying the color in the first format by a second conversion matrix comprising the selected first matrix to form a color in a second format.

According to another aspect, a method is disclosed for receiving a color in a first format comprising first and second coordinate values, selecting a conversion matrix from a plurality of submatrices in accordance with the first and second coordinate values, and multiplying the color in the first format by the selected conversion matrix to form a color in a second format.

According to another aspect, a method is disclosed for receiving a color in a first format comprising three values, selecting a first conversion matrix from a plurality of submatrices in accordance with the three values, forming a second conversion matrix comprising the selected first conversion matrix, and multiplying the color in the first format by the second conversion matrix to form a color in a second format.

According to another aspect, a method is disclosed for forming a plurality of matrices from one or more coefficients, selecting one of the plurality of matrices in response to a first color, chroma enhancing the first color using a chroma enhancement matrix comprising the selected one of the plurality of matrices, computing a metric as a function of the second value and a target value, and modifying one or more of the plurality of coefficients in response to the computed metric.

According to another aspect, computer readable media is disclosed, operable to perform receiving a color in a first format comprising first and second coordinate values, selecting a conversion matrix from a plurality of submatrices in accordance with the first and second coordinate values, and multiplying the color in the first format by the selected conversion matrix to form a color in a second format.

According to another aspect, computer readable media is disclosed, operable to perform forming a plurality of matrices from one or more coefficients, selecting one of the plurality of matrices in response to a first color, chroma enhancing the first color using a chroma enhancement matrix comprising the selected one of the plurality of matrices, computing a metric as a function of the second value and a target value, and modifying one or more of the plurality of coefficients in response to the computed metric.

Various other aspects and embodiments are also disclosed.

BRIEF DESCRIPTION OF THE DRAWINGS

FIG. 18 is an example graph of $K_a$ as a function of a.

DETAILED DESCRIPTION

One or more exemplary embodiments described herein are set forth in the context of a camera system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps. Method steps can be interchanged without departing from the scope of the present invention. The word "exemplary" is used herein to mean "serving as an example, instance, or illustration." Any embodiment described herein as "exemplary" is not necessarily to be construed as preferred or advantageous over other embodiments.

Because of differences between the spectral responses of human eyes and those of camera sensors, the colors obtained by cameras are different from those typically perceived by human eyes. To improve the color accuracy, by accounting for the difference between the reproduced colors and human perception, modern digital camera designs employ a color correction matrix and a color conversion matrix to convert RGB color space to $YC_bC_r$ space in a color-processing pipeline.

The main function of the color correction matrix is to compensate for the difference between the spectral sensitivities of camera sensors and the spectral responses of human visual system, also referred to as color matching function. The function of a chromatic enhancement matrix is to transfer RGB signal to $YC_bC_r$ signals. Adjusting coefficients in this matrix may perform further color tuning for the camera system.

In order to obtain the best color reproduction efficiency, the coefficients in the two matrices may be optimized according to camera properties, image quality requirements and also color preference.

Example embodiments described herein allow for converting from RGB to $YC_bC_r$ space to obtain optimized coefficients, which minimize the color difference between those produced by various cameras and those perceived by human eyes, and allow for color enhancement based user preference, environments, and other factors.

Various camera embodiments are well known in the art, including traditional digital cameras. Cameras are also included in cellular telephones, camcorders, Personal Digial Assistants (PDAs), notebook cameras, attached to personal computers (i.e. web-cams), and many other configurations. Techniques described herein may be adapted for use with any camera embodiment.

Figure 1:
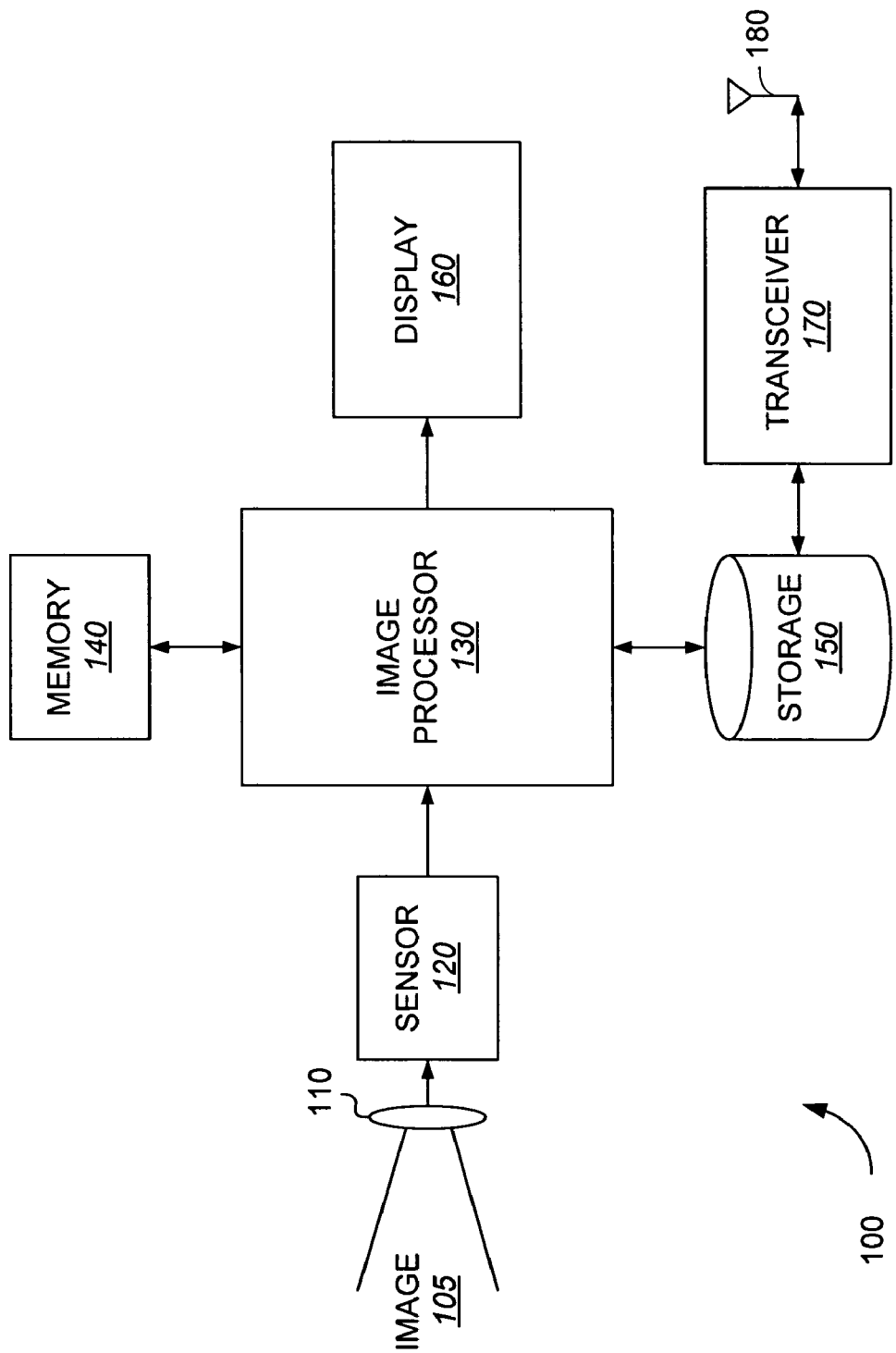
FIG. 1 depicts an example embodiment of a camera.

FIG. 1 depicts an example embodiment of a camera 100. Lens 110 receives light reflected from image 105 and directs that image to sensor 120. Various lenses and sensors are well known in the art. For example, a Charge Coupled Device (CCD) or a Complimentary Metal Oxide Semiconductor (CMOS) sensor may be commonly deployed. Sensor 120 may comprise one or more sensors. For example, in lower end products, a single CCD or CMOS sensor may be deployed. A physical location in a sensor, often referred to as a pixel, may only receive a single primary color (red, green, or blue). For display, it is desirable to have a red, green and blue value in each pixel, so, as described further below, interpolation or interpretation may be used when a single sensor is used to receive all three primary colors. For example, pixels in a sensor may be assigned to receive a single color, and neighboring pixels are assigned to receive different colors. The neighboring values may be used to estimate all three primary color values at each pixel. Some higher end products include three CCD sensors. For example, in such an embodiment, one CCD is deployed for each primary color (i.e. one for green, one for red, and one for blue). A lens 110 may comprise a beam splitter or prism to direct the light reflected from the image, for which a picture is being captured, to the corresponding CCD for that primary color. The output of sensor 120 is a raw signal comprising red, green and blue values for each pixel, referred to as an RGB signal.

Image processor 130 receives the RGB signal and performs various types of further image processing. Any type of image processing may be performed in image processor 130. Chroma enhancement embodiments are detailed herein which may be performed in image processor 130. Other examples include de-mosaic, white balance, color correction, gamma correction, various types of encoding and decoding, and processing for display output or other output. These are detailed further below.

In one embodiment a sensor 120 may be integrated on a single Integrated Circuit (IC) with image processor 130 (i.e. a CMOS sensor integrated with image processing components.) In an alternate embodiment, a sensor may be a separate device. Cellular phone configurations with integrated cameras are known in the art, as are digital cameras, camcorders, etc. The configuration 100 depicted in FIG. 1 is used for illustrative purposes and identifies example components of a camera in a wireless optional device. This is optional. Those of skill in the art will recognize various other configurations that may be deployed within the scope of the present invention. In one example, various separate components, such as ICs of various types, may be used in an image-processing pipeline. A raw signal may be introduced to a first module to generate a $YC_bC_r$ output while further processing may be performed on an alternate processor. In one embodiment, one or more image processing modules may be combined with a processor used for communications and/or other multi-media processing. In an alternate embodiment, image processing modules may be combined with an integrated circuit comprising one or more processors used for communications as well as other multi-media applications. In one embodiment, a Mobile Station Modem (MSM) comprises one or more processors for performing image processing on a $YC_bC_r$ output from one or more image processing components.

In an alternate embodiment, a raw signal may be delivered to a processor, which may perform all image processing functions, along with any other processes applicable to that embodiment. In yet another embodiment, an accelerator or other co-processing module may be coupled to a processor to perform image processing. These myriad other combinations of components, processors, digital signal processors, and the like may be combined in accordance with the teaching herein, as will be readily apparent to one of ordinary skill in the art.

Image processor 130 is coupled to memory 140, which may be used for storing data as well as instructions for performing the various procedures and methods described herein. Those of skill in the art will recognize that memory may be comprised of one or more memory components of various types, that may be embedded in whole or in part within image processor 130. Memory 140 may be used to store instructions for performing image processing along with other functions of image processing 130, partially processed image signals, as well as captured images.

Storage 150 is also shown connected to image processor 130. In one embodiment, storage 150 is shown separate from memory 140 for clarity of discussion. It will be clear to those of skill in the art that memory 140 may be used to store captured images and may be volatile or non-volatile, or a combination of both. In various embodiments, storage 150 may comprise volatile or non-volatile memory, fixed or removable (from device 100), disks, or any other storage medium known in the art. A socket for use with for removable memory cards may be deployed.

Display 160 is shown connected to image processor 130. Various embodiments may or may not include a separate display, such as a Liquid Crystal Display (LCD) or other type of display. Images may be shown on display 160 as a direct output of image 130. In an alternate embodiment, images stored in storage 150 may be displayed on display 160 through image processor 130, or, in an alternate embodiment, with a direct connection to display 160 (not shown).

Images, including still and video images, processed at image processor 130, may be compressed using any type of compression technique. Examples include Joint Photographic Experts Group (JPEG) or still images for Moving Picture Experts Group (MPEG) for video. Compression is optional.

In an alternate embodiment, a device 100 may not include storage 150 within the device. Instead, an output for connecting an external storage device may be deployed. Or, an output for connecting to external devices may be provided in combination with storage 150. In such fashion, increased storage may be made available through an external connection. As described above, storage 150 may comprise a removable media such that storage capacity may be increased or decreased by selecting the appropriate removable device.

In one embodiment, camera 100 is integrated with a communications device such as a mobile or cellular telephone, or other wireless communication device. Thus, FIG. 1 depicts transceiver 170 connected with storage 150 for transmitting and receiving images via antenna 180. A transceiver 170 may also be deployed for performing wireless communications. Any type of communication protocol may be deployed for receiving or transmitting data from device 100.

In this example, transceiver 170 is shown connected to storage 150 for retrieving images for transmission to a remote location, or for receiving images from a remote location and storing in storage 150. Received images may be processed in image processor 130 and/or displayed on display 160. As described further below, chroma enhancement may be performed in image processor 130. In various alternate embodiments, various other image processing techniques, examples of which are described further below, may or may not be performed prior to storing and/or chroma enhancement. Thus, raw data or partially processed data may be stored for further chroma enhancement using one or more chroma enhancement modes. Alternately, storage of images may be performed subsequent to all image processing. Any combination of these techniques may be deployed, as will be readily apparent to one of ordinary skill in the art.

Figure 2:
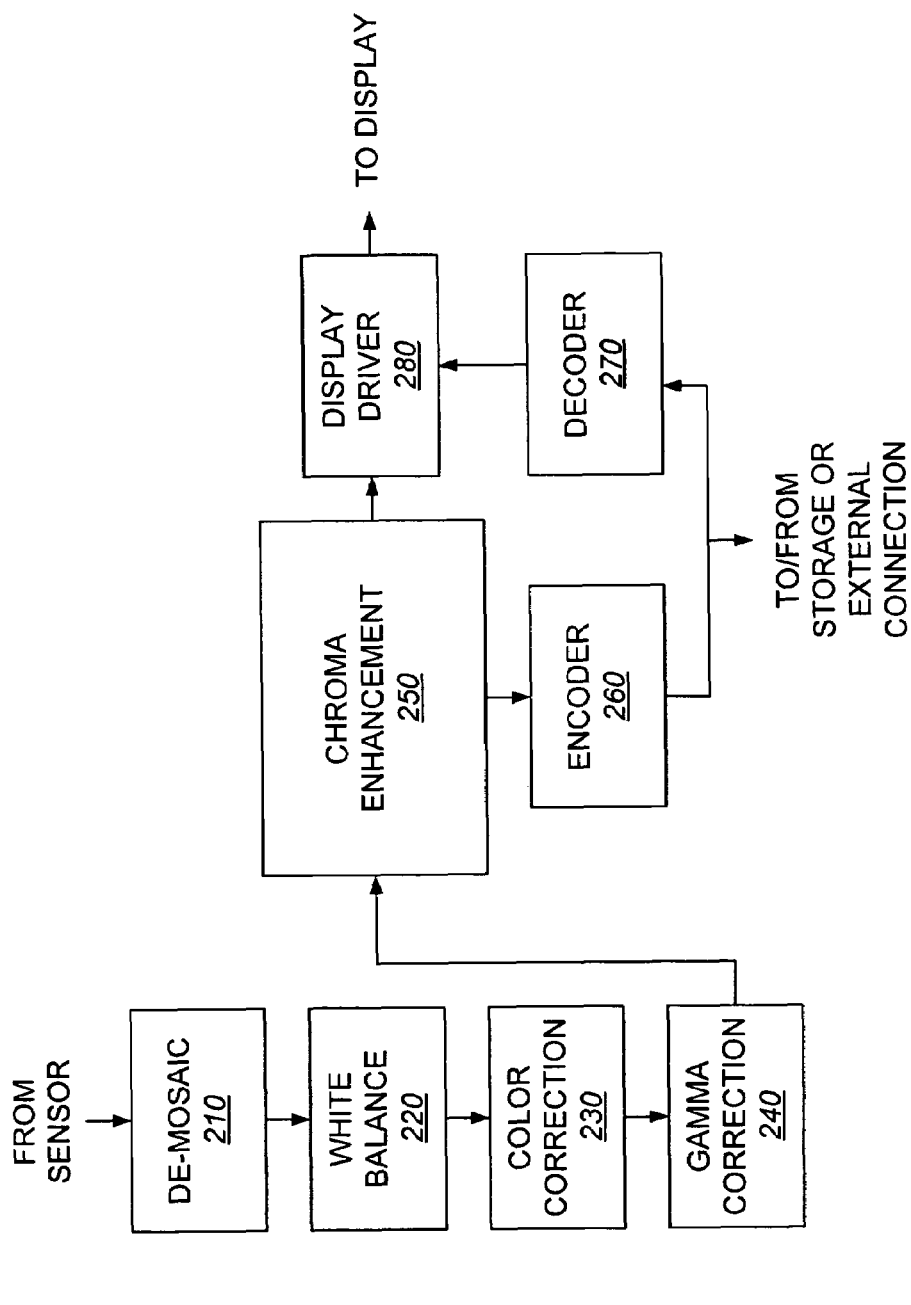
FIG. 2 depicts an example embodiment of an image processor.

FIG. 2 depicts an example embodiment of an image processor 130. Traditional image processing involves conversion of an RGB output (primary color space) of a sensor, such as sensor 120, to $YC_bC_r$, format (component color space). In $YC_bC_r$, the chrominance information and luminance information from the image are contained in separate channels. $YC_bC_r$ format is used for various compression methods, examples of which include JPEG and MPEG. The components depicted in the example embodiment 130 serve to illustrate chroma enhancement as detailed herein. Various alternate embodiments may include additional components or may omit one or more components depicted in FIG. 2. Furthermore, the order of processing may also vary in alternate embodiments (for example, white balance may precede demosaic, or may come after color correction).

Data received from a sensor, such as sensor 120, is delivered to de-mosaic block 210. De-mosaic functions are well known in the art, and are deployed for interpolation or interpretation of signals received from a single CCD or CMOS. The input generally comprises raw RGB signals, with a single color for each pixel, and the output is RGB data with interpolated values for red, green and blue at each pixel location. The output may be serialized (i.e. comprise three serialized signals or a single serialized signal), an array of data stored in memory, or any other technique for RGB data known in the art. In an alternate embodiment, in which three sensors are deployed (such as a 3-CCD camera), de-mosaic block 210 may not be needed, as a red green and blue value has been captured for each pixel already.

White balance block 220 is used to balance the relative intensity of the three RGB channels. In this example, white balance is performed on the output of de-mosaic 210 (or the raw signal, if de-mosaic is not deployed). Various white balance techniques are known in the art and may be deployed. For example, the gray world algorithm or color by correlation may be used.

Color correction block 230 receives the output of white balance 220 to perform color correction. As described above, a camera typically has spectral characteristics that respond to light differently than a human's response to light. Color correction attempts to balance the RGB channels to match eye. For example, in one embodiment, white balance is a 3×3 matrix transformation (diagonal matrix), which only applies to diagonal elements. The white balance effect is to turn up or down each of the RGB values. By contrast, in this example, color correction may employ a full 3×3 matrix. Values in the matrix are designed to make the response closer to what the eye would see. Gamma correction 240 receives the output of color correction 230. Gamma correction is used to normalize images projected on a display to imitate a human's view of the actual object on the display. For example, a typical monitor has a gamma characteristic. A linear characteristic may be desired.

Chroma enhancement block 250 converts RGB signals to $YC_bC_r$ signals as is traditionally done during color conversion. Chroma enhancement 250 additionally provides enhanced color performance, as illustrated below in various example embodiments.

The output of chroma enhancement 250 may be delivered to display driver 280 (optional) for converting the chroma enhanced signal for display on a monitor, such as display 160. In one embodiment, $YC_bC_r$ signals may need to be converted to an RGB (or other) format for display. The appropriate display driver for any type of display signal may be inserted to convert the output of chroma enhancement 250 for display on a monitor such as display 160. Encoder 260 receives the output of chroma enhancement 250 and may perform additional processing, such as encryption and/or compression and may be delivered for storage on media such as described above with respect to storage 150, as well as through an external connection to another remote device or storage element. Note that encoder 260 is optional. Alternatively, the raw data may be delivered for storage or through an external connection. The connection to storage 150 or alternate external connection may also be used to receive data by decoder 270, which may be used to decode or decompress to a format suitable for display, as described above. This feature may be used, for example, to display a stored picture for review on a camera or a mobile phone, the picture or video, having being compressed and stored, according to the respective format and storage media 150.

Figure 3:
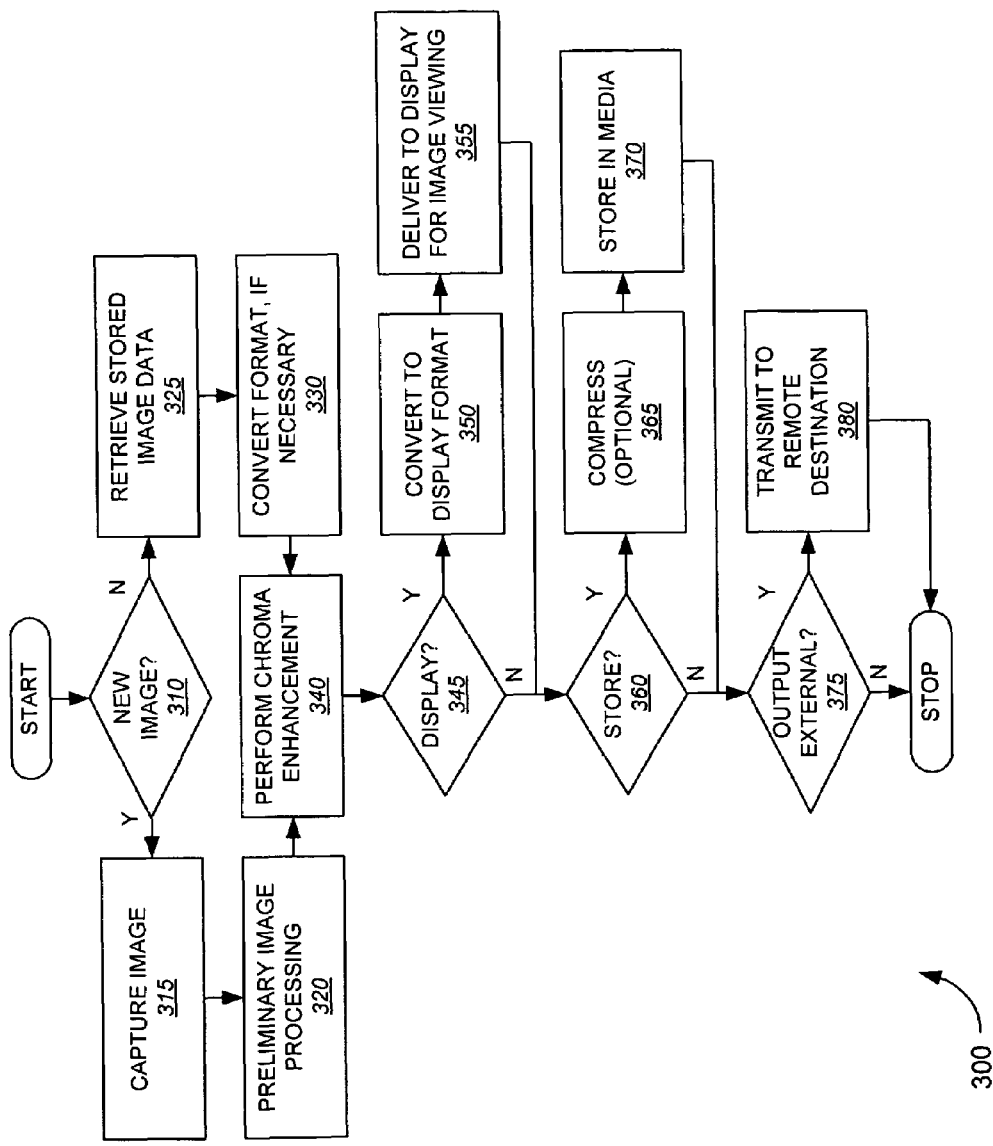
FIG. 3 depicts an example embodiment of a method for performing various functions on a device such as a camera, camcorder, mobile phone etc.

FIG. 3 depicts an example embodiment of a method 300 for performing various functions on a device 100, such as a camera, camcorder, mobile phone etc. The process begins in decision block 310. If a new image is to be captured, proceed to 315 to capture the image. This may be performed using a lens 110 and sensor 120 as described above. At 320, preliminary image processing is performed. This may include such functions as de-mosaic, white balance, color correction, or gamma correction, as described above. At 340, perform chroma enhancement, using any of the techniques described herein. In certain embodiments, chroma enhancement may be performed on stored images as well.

Returning to decision block 310, if chroma enhancement is desired on a stored image, proceed to 325 to retrieve stored image data. Image data may be stored in storage media 150, for example, or any other media, as known in the art. At 330, convert the format as necessary. For example, a JPEG or MPEG signal may need to be decompressed.

At 340, from either 320 or 330, perform chroma enhancement. Various chroma enhancement embodiments are detailed herein. In some embodiments, chroma enhancement is performed on RGB signals, thus the format conversion should convert the stored image data to RGB format. Various other conversions are known such as $YC_bC_r$, to RGB, as well as other color space formats. Once chroma enhancement is performed at 340, if the chroma enhanced image is to be displayed, at decision block 345, proceed to 350 to convert the chroma enhanced signal to the appropriate display format for the monitor or other display device. At 355, deliver the converted signal to display for image viewing. Then proceed to decision block 360. If no display is required, proceed to 360.

In decision block 360, if storage of the chroma enhanced signal is desired, proceed to 365 where optional compression may be deployed. At 370 the chroma enhanced signal may be stored in the appropriate media, as described herein. Once stored, or if storage is not desired, proceed to decision block 375.

At decision block 375, if an external output is desired, proceed to 380 to transmit to a remote destination. This may be a connection to external media, or other device for receiving image data for further processing display, printing, or any other technique known in the art. In one embodiment, images and video data may be transmitted via a wireless connection to one or more remote stations. Various cellular data and Wireless Local Area Network (WLAN) systems and standards are well known in the art. Subsequent to 375 or 380, the process may stop.

As described above, chroma enhancement includes color conversion with additional features for increased performance. A typical color conversion matrix commonly used in still imaging (JPEG) is given by equation 1. Y, $C_b$, and $C_r$ values are found by multiplying the matrix shown in equation 1 by the input R, G, and B values.

$$\begin{bmatrix} Y \\ Cb \\ Cr \end{bmatrix} \equiv \begin{bmatrix} 0.299 & 0.587 & 0.114 \\ -0.1687 & -0.3313 & 0.500 \\ 0.500 & -0.4187 & -0.0813 \end{bmatrix} \times \begin{bmatrix} R \\ G \\ B \end{bmatrix} \quad \text{Equation 1}$$

The color conversion matrix depicted in equation 1 may be decomposed into two matrices, M1, and M2, as shown in equation 2. Thus, multiplying the RGB input by M2 and by M1 results in the $YC_bC_r$ values.

$$\begin{bmatrix} Y \\ Cb \\ Cr \end{bmatrix} \equiv [M1] \times [M2] \times \begin{bmatrix} R \\ G \\ B \end{bmatrix} \quad \text{Equation 2}$$

Matrix M2 converts (R, G, B) to (Y, B-G, R-G), and M1 converts (Y, B-G, R-G) to (Y, $C_b$, $C_r$). Matrix M1 comprises a 2 by 2 submatrix, commonly called the Chroma Enhancement Matrix (CEM). The CEM submatrix of M1 is illustrated as shown in equation 3.

$$\begin{bmatrix} Y \\ Cb \\ Cr \end{bmatrix} \equiv \begin{bmatrix} 1 & 0 & 0 \\ 0 & \begin{bmatrix} CEM \end{bmatrix} \\ 0 \end{bmatrix} \times [M2] \times \begin{bmatrix} R \\ G \\ B \end{bmatrix} \quad \text{Equation 3}$$

The CEM commonly used in JPEG color conversion is shown below in equation 4, for illustration. Not that this example CEM consists of four coefficients.

$$CEM = \begin{bmatrix} 0.500 & -0.1687 \\ -0.0813 & 0.500 \end{bmatrix} \quad \text{Equation 4}$$

Many modern digital camera designs use either the fixed color conversion matrix, or an optimized CEM for a given illuminant. Both methods have limited accuracy and flexibility due to their fixed or limited number of coefficients.

To improve the color performance, disclosed herein are advanced methods for improving chroma accuracy, by reducing the color difference between the reproduced colors and human perceptual responses, as well as enhancing preferred colors, such as memory colors. Memory colors include those people are very familiar with, for example, human skin colors, sky blue, foliage green, and so on. People may use the reproduced colors of memory colors to judge image quality. High quality images should be able to reproduce colors in accordance with preferences, in particular to colors to which more attention may be paid. The proposed advanced chroma enhancement method also increases flexibility, allowing for optimizing of specific colors with little impact on other colors.

The traditional optimization method is to optimize the four parameters of the 2×2 CEM to reduce the color difference between the reproduced color by digital cameras and human eyes. In an example embodiment, the number of parameters is increased from 4 to 8. The example embodiments detailed below using eight parameters to form the CEM coefficients are illustrative only. In general, the CEM conversion matrix may be formed from any number of parameters.

Y can be formed using any parameters, examples of which are shown in Equation 1. Chroma enhancement may be performed by fixing M2 and optimizing a general CEM, as defined in Equation 5.

$$CEM = \begin{bmatrix} a & ab \\ cd & c \end{bmatrix} \quad \text{Equation 5}$$

For each parameter a, b, c, and d there are two choices, each with the subscript p or m, given as $a_p$, $a_m$, $b_p$, $b_m$, $c_p$, $c_m$, $d_p$, and $d_m$. There are therefore eight parameters in the transfer matrix.

Figure 4:
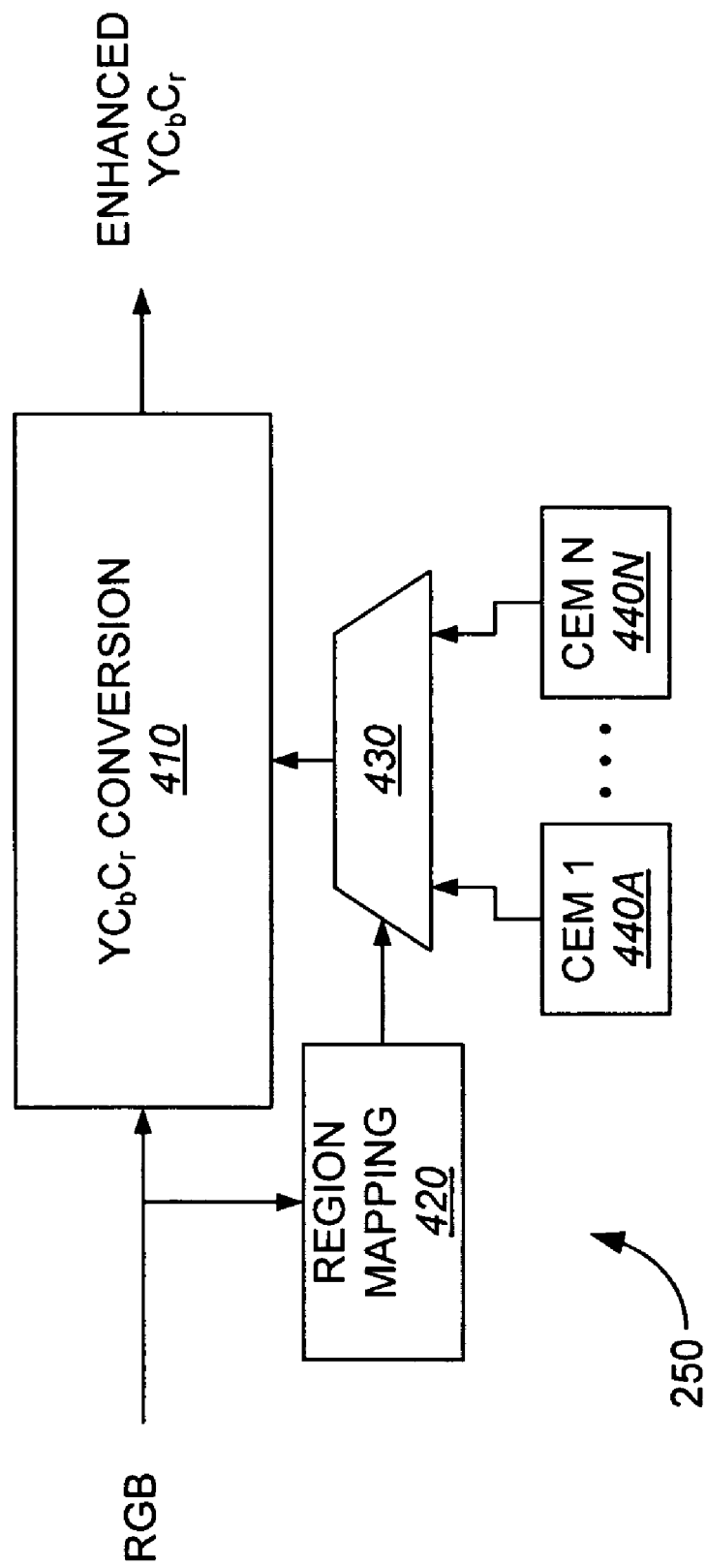
FIG. 4 depicts an example embodiment of chroma enhancement.

FIG. 4 depicts an example embodiment of chroma enhancement 250. RGB signals are received at $YC_bC_r$ conversion 410 to produce enhanced $YC_bC_r$ signals. Region mapping 420 also receives the RGB signal and indicates to selector 430 which one of N CEM submatrices 440A-N should be delivered to $YC_bC_r$ conversion 410. In this example, CEM submatrices 440 are pre-computed using eight parameters, and the appropriate pre-computed CEM submatrix may be selected for use in chroma enhancement according to region. In an alternate embodiment, the CEM may be computed "on the fly", based on the selected region. Region mapping for selecting one of the plurality of submatrices will be detailed further below.

Note that the blocks shown in FIG. 4, as with other embodiments detailed herein are illustrative only. The various embodiments may be deployed using any number of selection techniques. For example, a software or DSP implementation may use pointers, function calls, procedures and the like to select the appropriate coefficient for performing image processing using techniques detailed herein. A hardware implementation may use a multiplexer, multi port RAM, register file, or another technique for selecting one or more chroma enhancement matrix coefficients for use in $YC_bC_r$ conversion 410.

Figure 5:
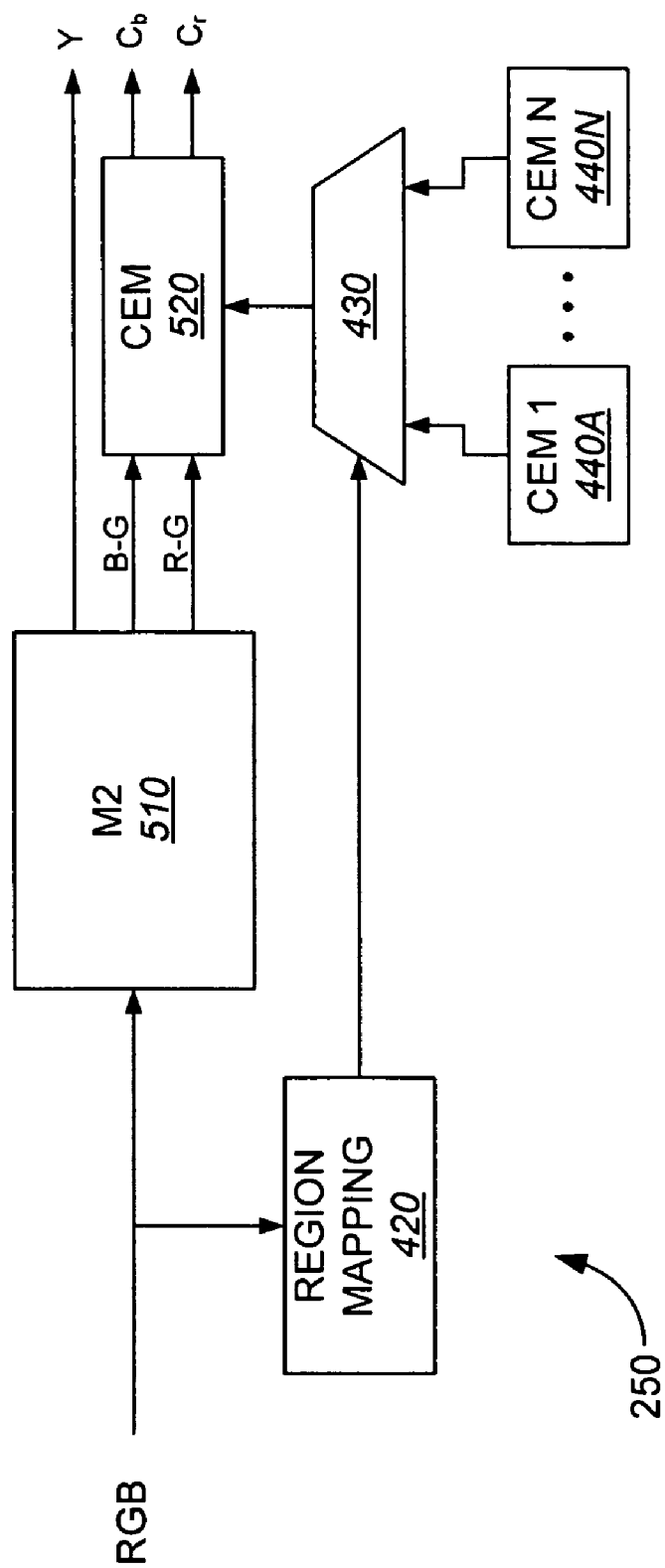
FIG. 5 depicts another embodiment of chroma enhancement.

FIG. 5 depicts another embodiment of chroma enhancement 250. In this example, region mapping 420, selector 430, and chroma enhancement submatrices 440A-N are deployed in similar fashion as described above with respect to FIG. 4. Matrix M2 510, similar to the matrix M2 detailed above, will be deployed to generate the Y values as well as a B-G signal comprising the difference between blue and green values and an R-G signal comprising the difference between red and green values for delivery to CEM 520. CEM 520 is used to produce the chroma values $C_b$ and $C_r$. FIG. 5 is one embodiment illustrating transforming RGB to $C_b$ and $C_r$, using B-G and R-G.

The transformation from the color space (B-G, R-G) to ($C_b$, $C_r$) is represented as shown in equation 6.

$$\begin{bmatrix} C_b \\ C_r \end{bmatrix} = \begin{bmatrix} a & ab \\ cd & c \end{bmatrix} \cdot \begin{bmatrix} B-G \\ R-G \end{bmatrix} \quad \text{Equation 6}$$

The 2×2 CEM can be further decomposed as shown in equation 7.

$$\begin{bmatrix} C_b \\ C_r \end{bmatrix} = \begin{bmatrix} a & 0 \\ 0 & c \end{bmatrix} \cdot \begin{bmatrix} 1 & b \\ d & 1 \end{bmatrix} \cdot \begin{bmatrix} B-G \\ R-G \end{bmatrix} \quad \text{Equation 7}$$

In the first matrix, a and c are the scaling factors for each coordinate, and in the second matrix, b and d are shearing factors for each coordinate. The transformation expressed by the matrices above simplifies the relationship from (B-G, R-G) to ($C_b$, $C_r$) as space shearing and scaling.

Figure 6:
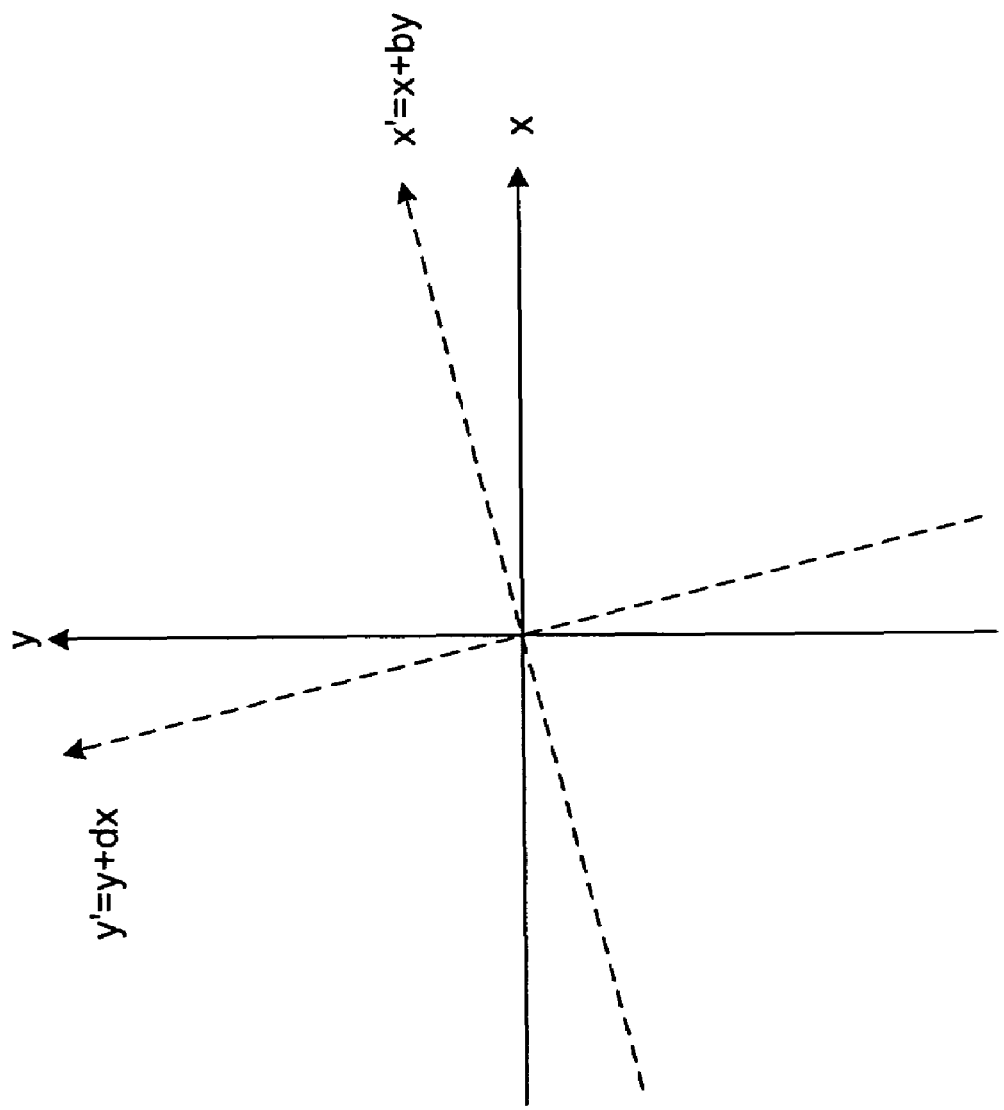
FIG. 6 illustrates an example of shearing with the two parameters b and d.

Consider space shearing. In order to simplify the representation, use x to represent R-G and (x', y') to represent a rotated space. The transformation is shown in equation 8. FIG. 6 illustrates an example of shearing with the two parameters b and d.

$$\begin{bmatrix} x' \\ y' \end{bmatrix} = \begin{bmatrix} 1 & b \\ d & 1 \end{bmatrix} \cdot \begin{bmatrix} x \\ y \end{bmatrix} \quad \text{Equation 8}$$

Figure 7:
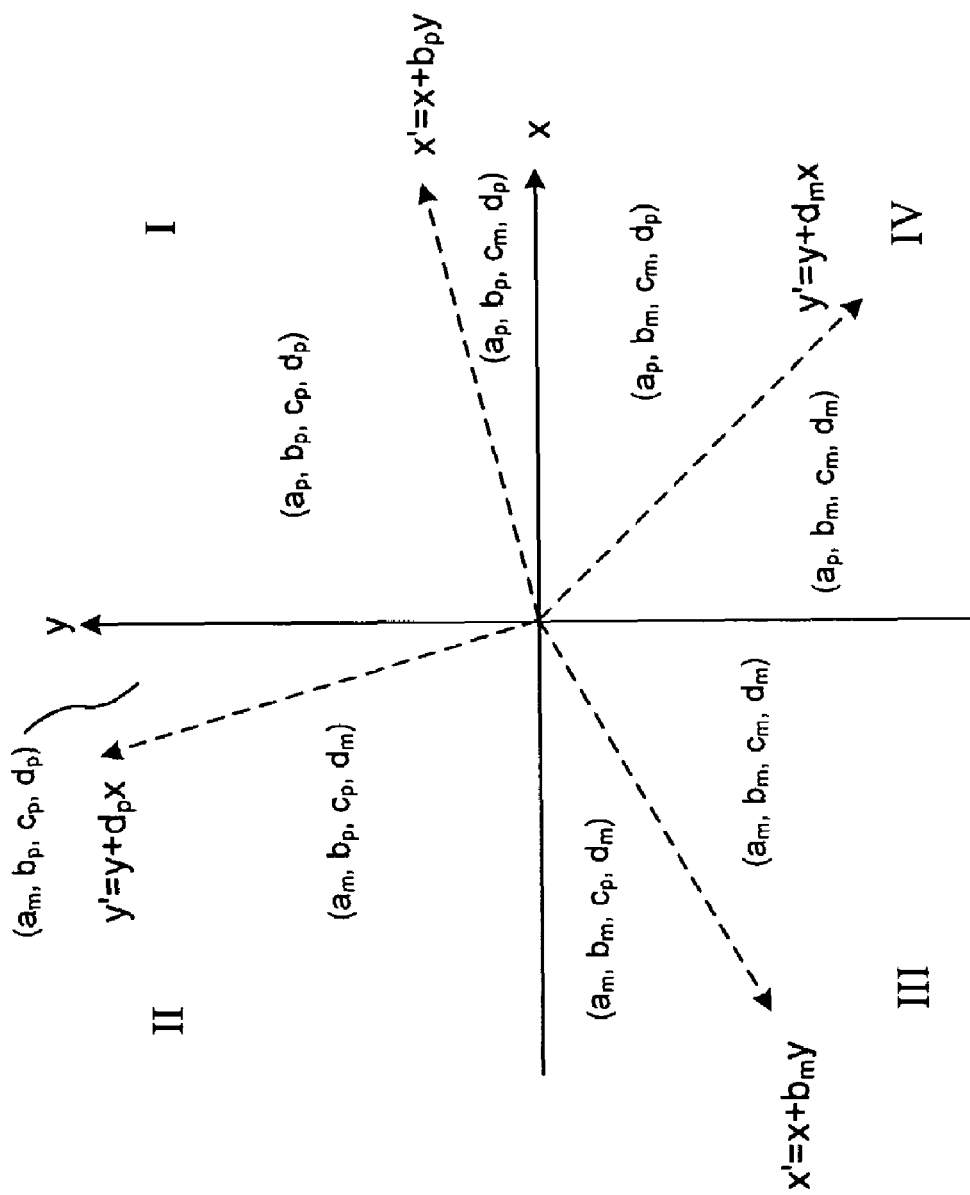
FIG. 7 illustrates an example of more generalized space shearing.

The actual relationship between the color space of (B-G, R-G) and ($C_b$, $C_r$) is more complicated than a simple shearing transformation. In order to provide more flexibility for the transformation between two spaces, an example embodiment enables the shearing factors, b and d, to adjust for each color according to its quadrant in the original (B-G, R-G). One embodiment illustrating this idea is shown in FIG. 7. With four parameters $b_p$, $b_m$, $d_p$, and $d_m$, the four quadrants of ($C_b$, $C_r$) have a more flexible relationship with respect to the original (B-G, R-G) space. In FIG. 7, two line segments for x' and two line segments for y' are shown. In conjunction with the x and y axis, these line segments delineate eight regions, as shown. In each region, a unique set of four parameters a, b, c, and d are selected, as indicated by the respective subscripts. In this example, a first segment is identified in Quadrant I as x'=x+$b_p$y; a second segment is identified in Quadrant II as y'=y+$d_p$x; a third segment is identified in Quadrant III as x'=x+$b_m$y; and a fourth segment is identified in Quadrant IV as y'=y+$d_m$x.

Select $b_p$ and $b_m$ according to Equation 9.

$$b=b_p \text{ when}(R-G)>0; \ b=b_m \text{ when}(R-G)\leq 0 \quad \text{Equation 9}$$

Select $d_p$ and $d_m$ according to Equation 10.

$$d=d_p \text{ when}(B-G)>0; \ d=d_m \text{ when}(B-G)\leq 0 \quad \text{Equation 10}$$

Thus, FIG. 7 illustrates an example of how a more generalized space shearing may be performed.

Consider now the space scaling transformation from the rotated space (x', y') to ($C_b$, $C_r$). The transformation may be represented as shown in equation 11.

$$\begin{bmatrix} C_b \\ C_r \end{bmatrix} = \begin{bmatrix} a & 0 \\ 0 & c \end{bmatrix} \cdot \begin{bmatrix} x' \\ y' \end{bmatrix} \quad \text{Equation 11}$$

As seen in equation 11, $C_b$=ax' and $C_r$=cy'. In order to provide additional choices for the scaling factors according to the four directions of (x', y') as x'>0, x'≤0, y'>0, and y'≤0, a and c are assigned $a_p$, $a_m$, and $c_p$, $c_m$, respectively. The sheared coordinates (x', y') are obtained from the (B-G, R-G) space as shown in Equations 12 and 13, respectively.

$$x'=(B-G)+b\cdot(R-G) \quad \text{Equation 12}$$

$$y'=(R-G)+d\cdot(B-G) \quad \text{Equation 13}$$

The selection of a and c are made according to Equations 14 and 15, respectively.

$$a=a_p \text{ when}(B-G)+b\cdot(R-G)>0; \quad \text{Equation 14}$$

$$a=a_m \text{ when}(B-G)+b\cdot(R-G)\leq 0$$

$$c = c_p \text{ when}(R-G)+d\cdot(B-G) > 0 \quad \text{Equation 15;}$$

$$c = c_m \text{ when}(R-G)+d\cdot(B-G) \leq 0$$

Figure 8:
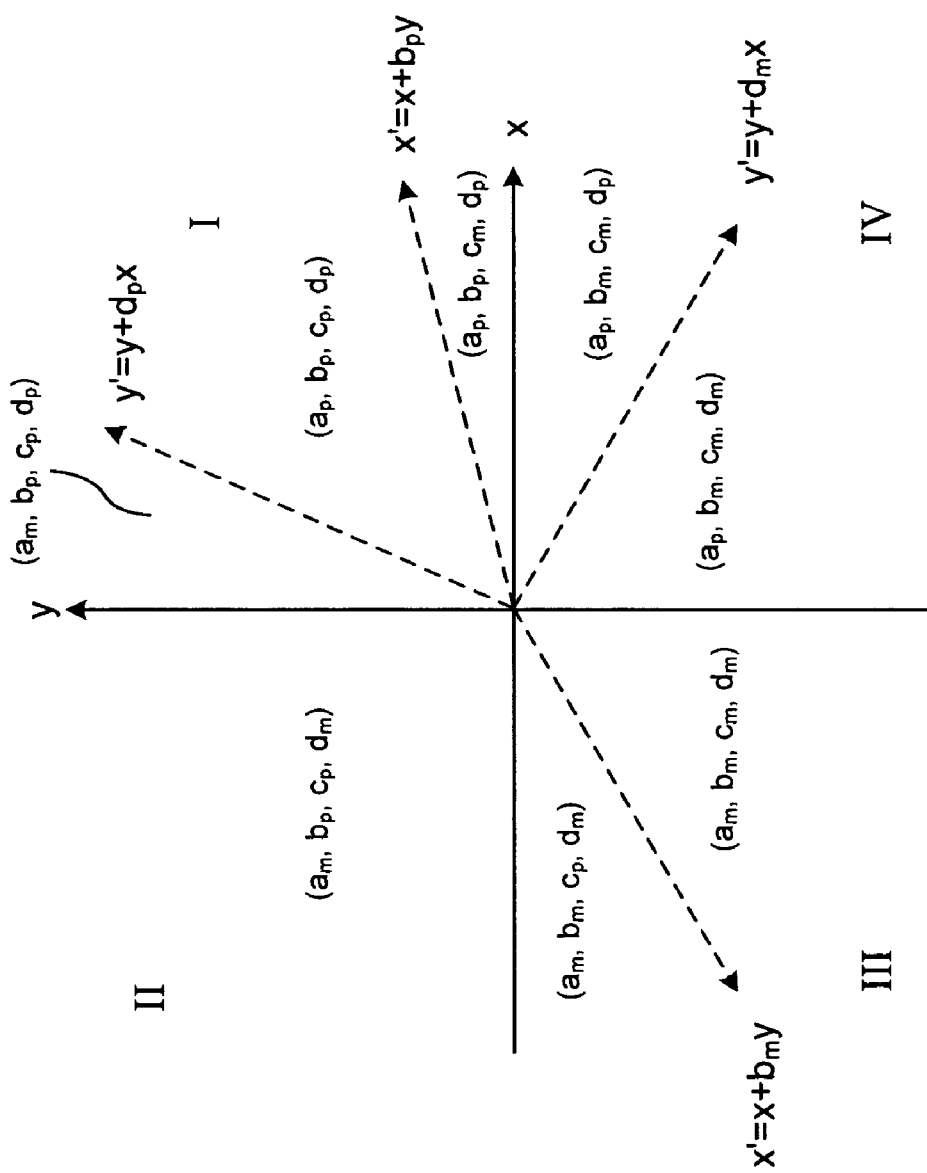
FIG. 8 illustrates an alternate example of generalized space shearing.

The eight regions in this example embodiment need not be distributed as shown in FIG. 7. FIG. 8 offers an alternate example including two segments in quadrant I identifying three regions. A single region comprises all of quadrant II and two regions are delineated by single segments in each of both quadrants III and IV. Those of skill in the art will recognize that various techniques for selecting CEM submatrices may be deployed as described above. For example, region-mapping 420 may be used to select submatrices using any technique for identifying a, b, c, and d according to corresponding RGB values as shown in FIGS. 7 and 8 as illustrated, and with respect to equations 5 through 15 above. Note that a conventional color conversion uses a fixed conversion matrix with axes defined by two straight lines. By contrast, embodiments detailed herein allow for four independent rays (alternate embodiments may use a greater number of independent rays with additional parameters and/or submatrices mapped to the additional regions defined in the coordinate space).

Both FIGS. 7 and 8 illustrate the selection of matrix coefficients in accordance with an example set of rays according to (x, y) and (x', y'). Again, note that the possible CEM submatrices (i.e. candidate matrices for use as the CEM matrix) may be pre-computed and selected by a region mapping function in response to the coordinate location of the color space value being converted (using equations 5-15, for example). Alternatively, the CEM values may be computed directly using the coordinate location of the color space value and the corresponding parameters. Thus, the CEM may be formed by selecting one of the eight pre-computed submatrices, as shown in FIGS. 4 and 5, or may be equivalently computed by selecting the appropriate four of the eight pre-determined parameters. Generating the eight parameter values (and, equivalently, the eight submatrices) will be detailed further below.

Figure 9:
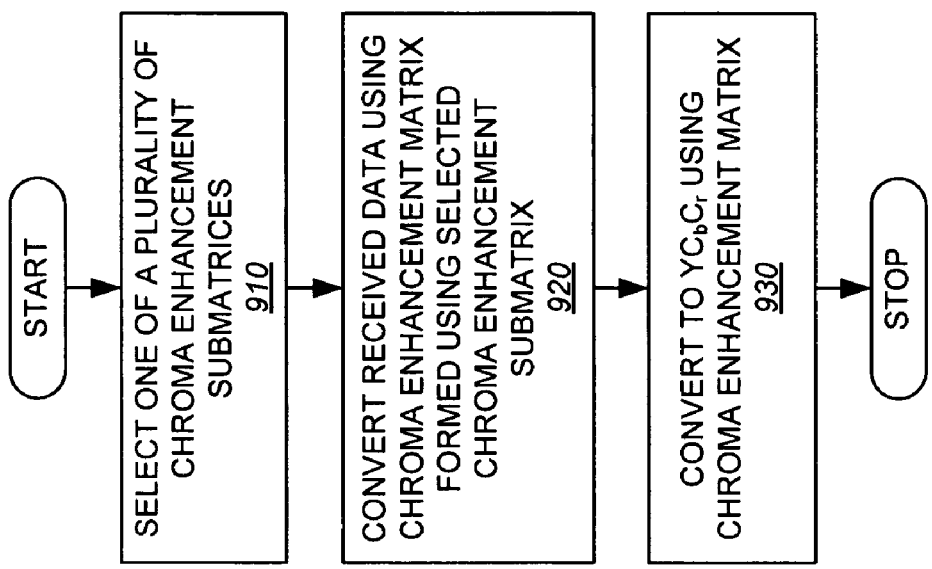
FIG. 9 illustrates an example embodiment of a method for performing chroma enhancement.

FIG. 9 illustrates an example embodiment of a method 340 for performing chroma enhancement. This example embodiment is suitable for deployment as chroma enhancement 340, described above with respect to FIG. 3. The process begins at 910, where one of the pluralities of chroma enhancement submatrices is selected. At 920 convert received data (i.e. data from an image capture or retrieved from storage media) using a chroma enhancement matrix formed using the selected chroma enhancement submatrix. At 930, convert to $YC_bC_r$ using the chroma enhancement matrix. Then the process may stop.

Figure 10:
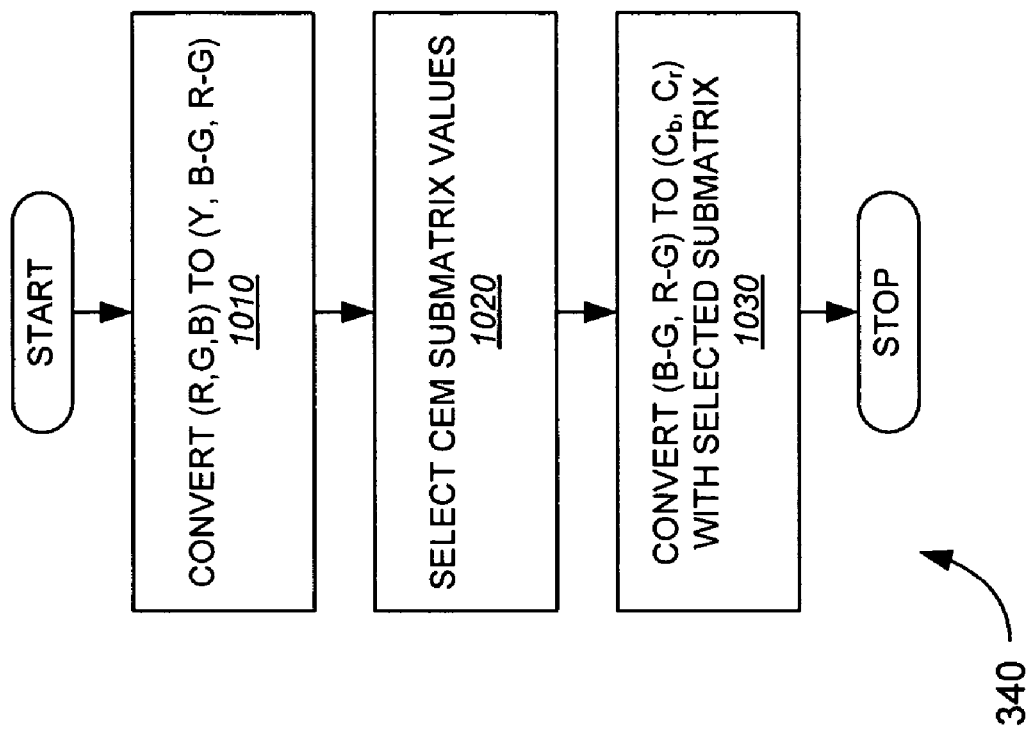
FIG. 10 illustrates another embodiment of a method for chroma enhancement.

FIG. 10 illustrates another embodiment of chroma enhancement 340. At 1010, convert RGB to (Y, B-G, R-G). This may be performed using any number of techniques. An example technique is detailed above with respect to FIG. 5. At 1020, select CEM submatrix values. The CEM sub matrix values may be selected by mapping the RGB value to the appropriate region, as illustrated in FIGS. 7-8, or any other technique such as using equations 5-15 detailed above. At 1030, convert (B-G, R-G) to $(C_b, C_r)$ with the selected submatrix. Then the process may stop.

Figure 11:
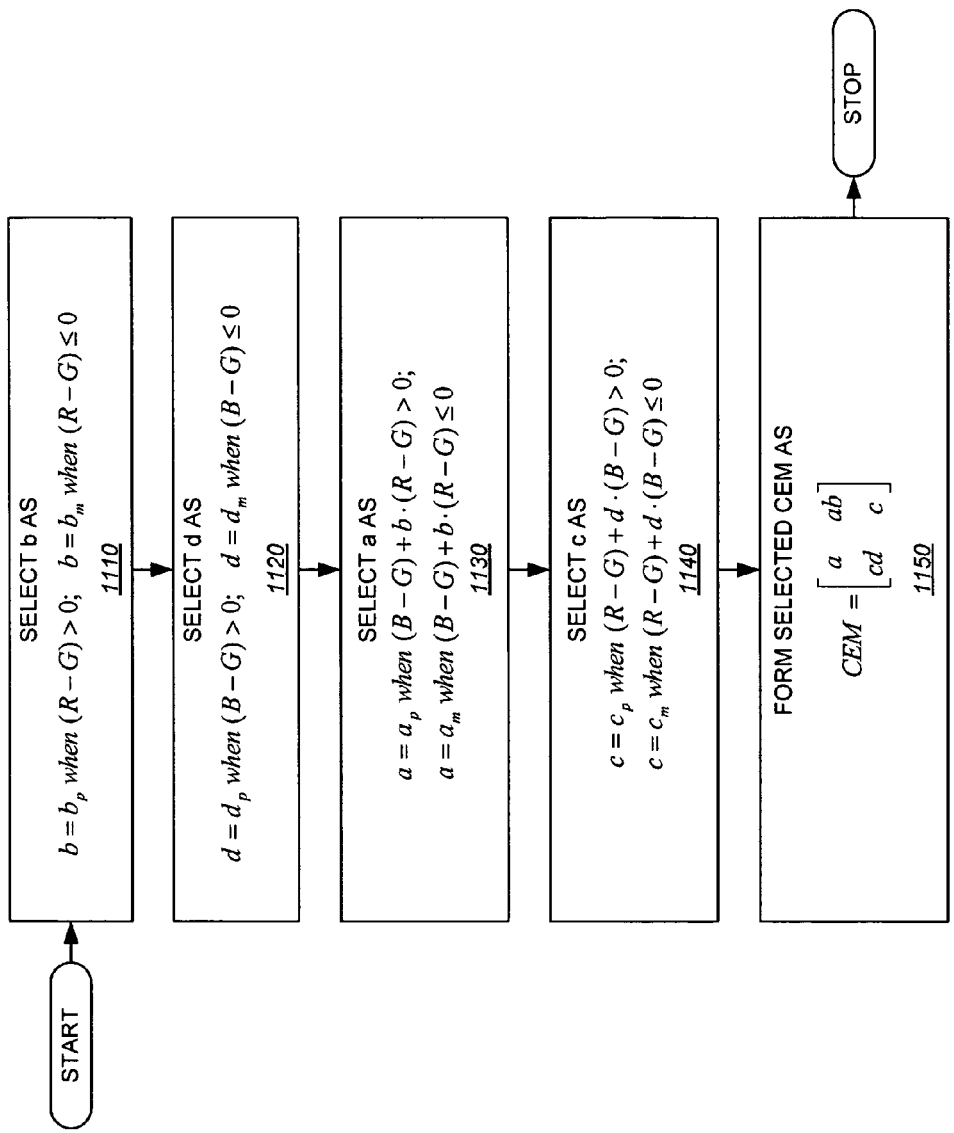
FIG. 11 illustrates an example embodiment of a method for converting (B-G, R-G) data to ($C_b$, $C_r$) data.

FIG. 11 illustrates an example embodiment of a method 1030 for converting (B-G, R-G) data to $(C_b, C_r)$ data, as described above. At 1110, select b as given in equation 9 above. At 1120, select d as given above with respect to equation 10. At 1130, select a in accordance with the selected b, as detailed above in equation 14. At 1140, select c in accordance with selected d, as given above in equation 15. At 1150, form the selected CEM as shown in equation 5, combining the selected a, b, c, and d, as shown.

Figure 12:
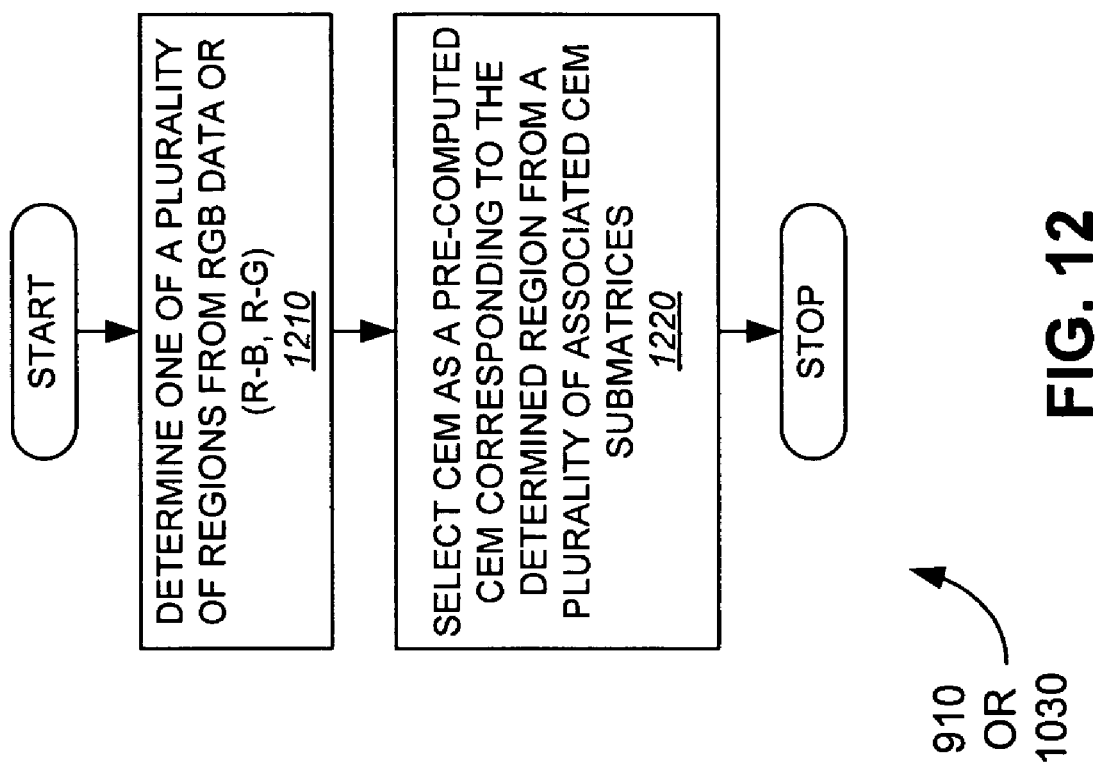
FIG. 12 illustrates an example embodiment of a method for selecting one of a plurality of chroma enhancement sub matrices.

FIG. 12 illustrates an example embodiment of a method for selecting one of a plurality of chroma enhancement sub matrices. This embodiment is suitable for deployment as 910 or 1030, as described above. At 1210, determine one of a plurality of regions from the RGB data, or, in the alternative, (B-G, R-G) data. At 1220, select the CEM as a pre-computed CEM corresponding to the determined region from a plurality of associated CEM submatrices. In this example, The eight CEM submatrices are pre-computed using the possible selections of a, b, c, and d and combining them as shown in equation 5. Then the appropriate CEM is selected in response to the location of the RGB data within the region defined, as described above. In an alternate embodiment, the CEM may be recomputed on the fly.

Figure 13:
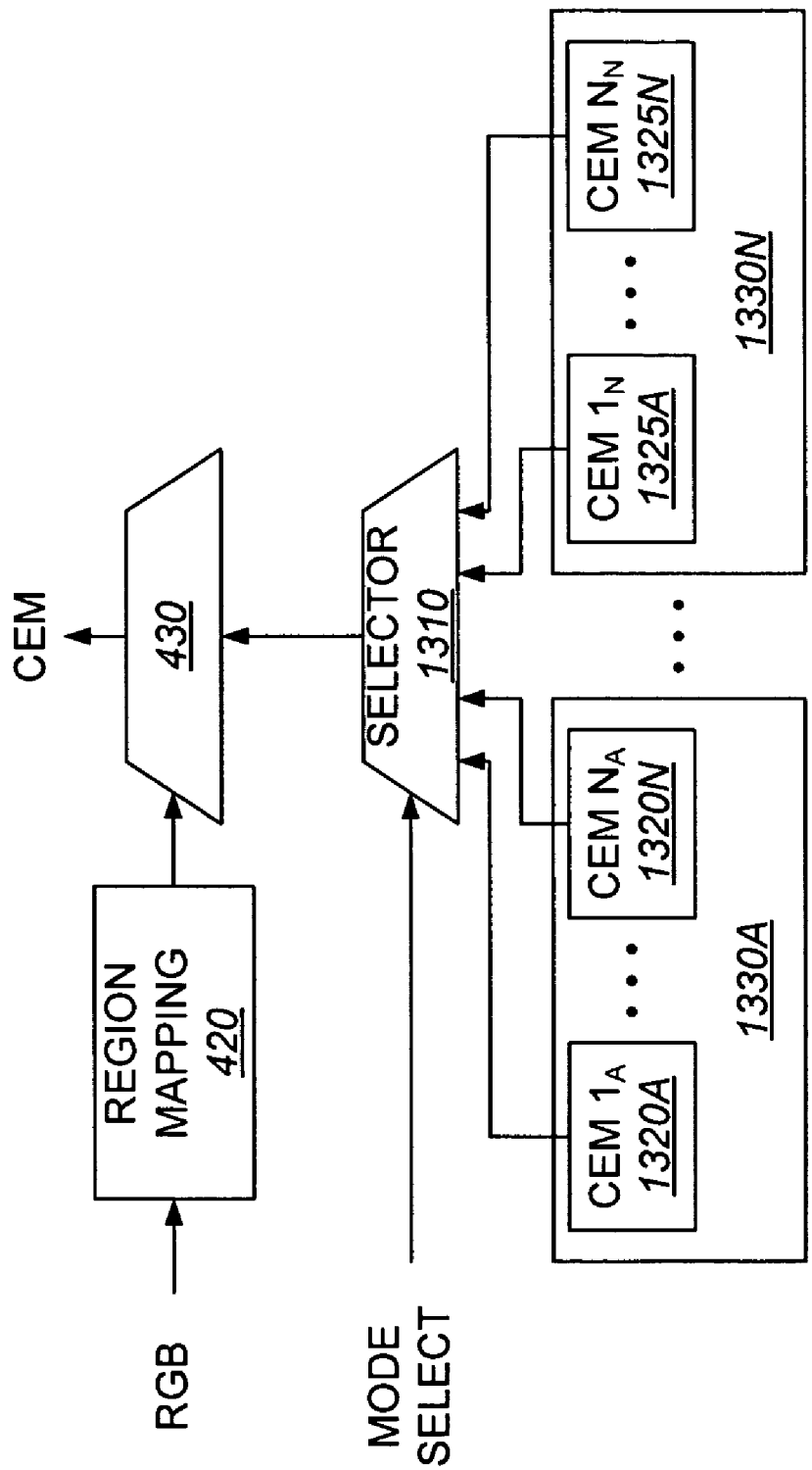
FIG. 13 depicts another alternate embodiment of chroma enhancement.

FIG. 13 depicts another alternate embodiment of chroma enhancement 250. This embodiment may be combined with chroma enhancement aspects, such as this illustrated in FIG. 4 or FIG. 5. Region mapping 420 and selector 430 are deployed similarly to produce a CEM submatrix for use in chroma enhancement. In addition, in this embodiment, a selector 1310 is deployed to select one of a plurality of sets of CEM submatrices. As before, the CEM may also be computed on the fly based on selected parameters, in an alternate embodiment. The set of CEM submatrices selected by selector 1310 is chosen according to a mode select signal. So, for example, in one mode, CEM set 1330A is selected. In another mode, CEM set 1330N is selected. CEM set 1330A comprises submatrices CEM $1_A$-$N_A$ 1320A-N. CEM set 1330N comprises submatrices CEM $1_N$-$N_N$ 1325A-N. CEM submatrices 1320 and 1325 may be similar to CEM submatrices 440, illustrated with respect to FIGS. 4 and 5, and may be determined in accordance with any of the variety of techniques described herein. A mode select feature allows for sets of CEM submatrices to be generated for various environments or settings. Each set of CEM submatrices 1330 may be selected depending on the environment and/or preference selected. For example, different settings may be determined for lighting environments, such as low light, outdoor daylight, indoor fluorescent, or indoor/incandescent. Any number of other environments may also be deployed. Furthermore, various people may have different preferences. For example, cultural differences or geographical boundaries may result in groups of people preferring certain color types. The set of submatrices may be determined using various techniques including using optimization techniques detailed further below.

Macbeth charts, known in the art, comprise an array of 24 colors used to normalize color perception from a display or other device. Given the fact that the transfer function of the human eye is generally different than the transfer function of a monitor (as well as differences in transfer functions for various monitor types), it is possible to normalize using image processing techniques with a Macbeth chart as a reference. In one example, a user may compare a color on a Macbeth chart and a color on a monitor to determine whether they are similar. Adjustments can be made to normalize the two, which will then normalize the differences between the transfer functions of that human's eye as well as the transfer function of that monitor. In an example embodiment, the color conversion matrix is designed to compensate for a camera's sensor response differences. It can also be used to compensate for display transfer function differences. In addition to normalizing with a reference, such as a Macbeth chart, users may chose between a variety of displayed outputs in accordance with varying parameters to select their preferences. Thus, it is possible to perform psychophysical tests by showing different charts to users and having users pick their favorites.

An ISO standard, CIELab has been developed to linearize perceptible color differences. In other words, CIELab provides a perceptually uniform color space. Each of the 24 patches of a Macbeth chart has a coordinate in the CIELab. In order to perform optimization of CEM submatrix coefficients, a variety of techniques may be deployed. First, an image may be captured, followed by desired image processing, including chroma enhancement, and the image may be displayed on a monitor. A user may then look at the object, as well as the corresponding representation of that object on the monitor, and indicate whether a match exists. Various parameters may be changed in order to optimize the display until the user identifies the closest relationship between the display and the actual image has been reached. This is one way of computing parameters as described above. Preferences may also be used this way, by allowing various or groups of users to select preferred viewing for use as described above with respect to FIG. 13. Various environments may also be tested by changing, for example, the lighting of the image (i.e. outdoor, indoor, fluorescent, incandescent, etc.). Parameters, such as CEM submatrix coefficients, may be optimized for each environment. Other techniques may be deployed without the need for human interaction.

Figure 14:
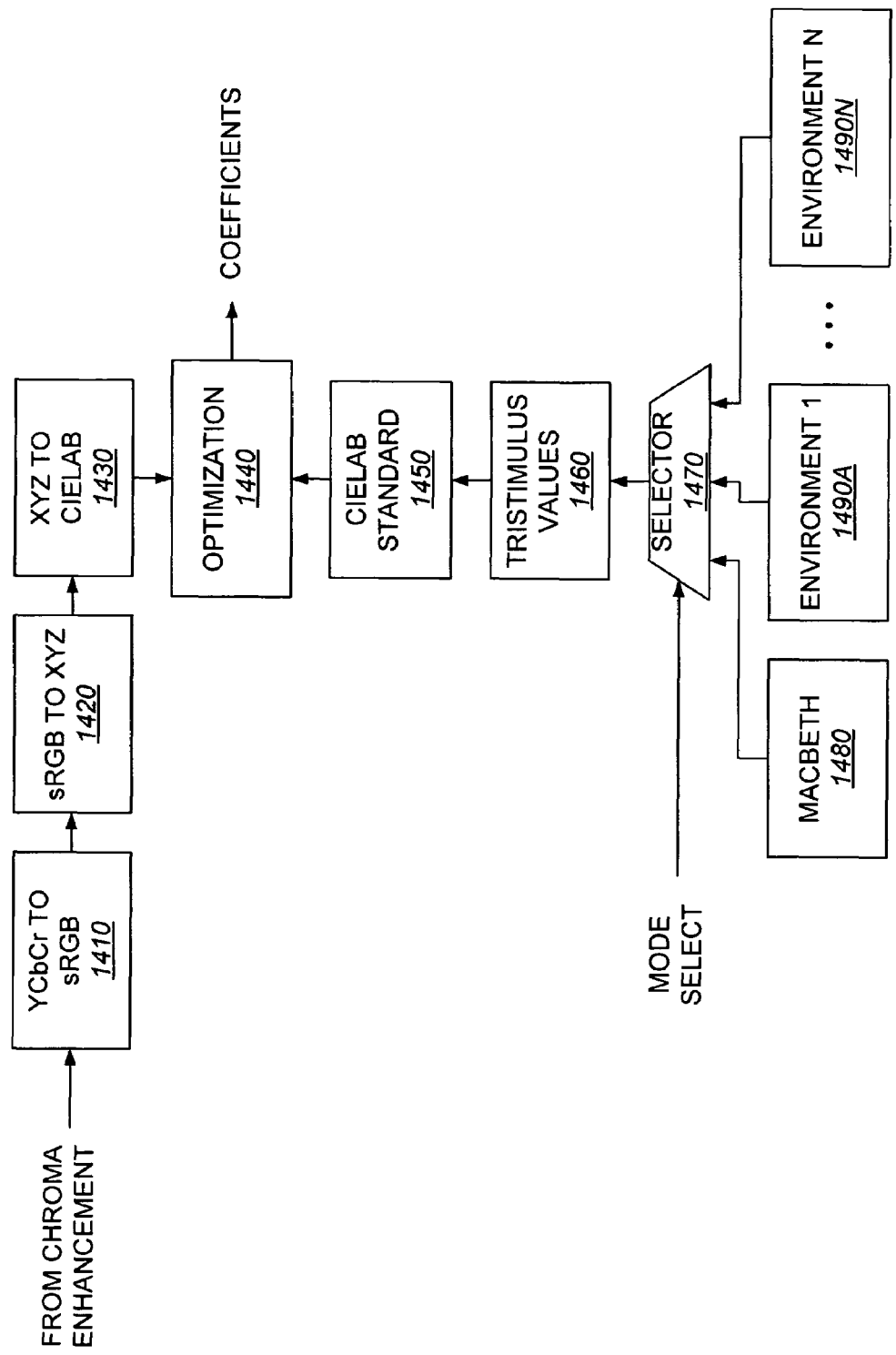
FIG. 14 illustrates an embodiment of a system for performing optimization of CEM coefficients.

FIG. 14 illustrates an embodiment of a system for performing optimization of CEM coefficients. $YC_bC_r$ outputs from a chroma enhancement block, such as any of those detailed above, are delivered to block 1410 for $YC_bC_r$ to sRGB conversion. Well known in the art, sRGB to XYZ conversion is carried out in Block 1420. XYZ is an intermediate format between RGB and CIELab. XYZ values are also referred to as tri-stimulus values. In block 1430, XYZ values are converted to CIELab through the CIELab space. Optimization block 1440 receives the CIELab values from block 1430, and CIELab standard 1450 to generate coefficients.

In one embodiment, the coefficients are fed back for use in chroma enhancement during the optimization cycle. The signal input to chroma enhancement (not shown) comes from image capture or retrieval of a stored image, in accordance with the environment and/or reference desired. For example, a camera may be pointed at a patch of a Macbeth chart, and the corresponding CIELab value will be used for optimization in block 1440. This can be seen, for example, in FIG. 14, by selecting the Macbeth chart 1480, with selector 1470, in accordance with the mode select signal. Block 1460 receives the Macbeth color and generates tri-stimulus values in accordance therewith. The CIELab standard value is generated in accordance with the tri-stimulus in block 1450 and sent to optimization 1440. Thus, the coefficients for the example Macbeth environment may be determined.

To generalize, environments 1-N 1490A-1490N may also be selected by selector 1470 in accordance with the mode select signal. Any optimization technique known in the art may be deployed in optimization block 1440, examples of which are detailed further below. Note that the embodiment of FIG. 14 serves to illustrate various aspects of optimization of CEM coefficients. Various alternatives will be apparent to those of skill in the art. For example, alternate or additional conversions to alternate signal types or color spaces may be substituted or added. The standard used for optimization need not be CIELab. The standard in block 1450 may be generated as described, or standard values may simply be stored for use in optimizing.

Figure 15:
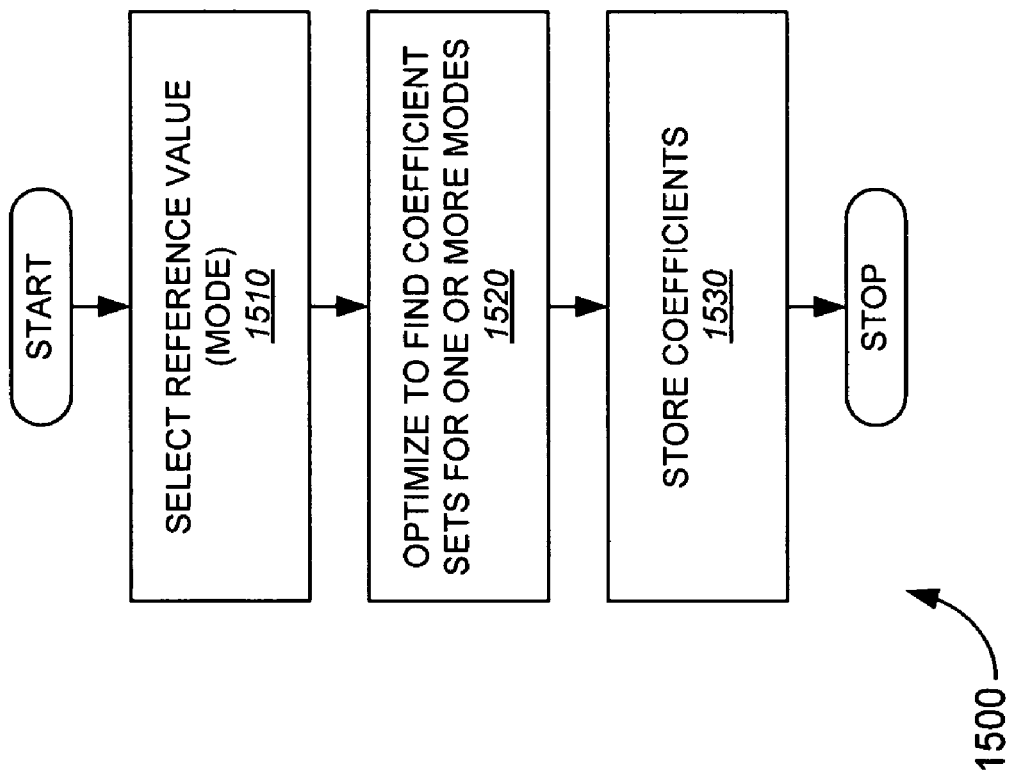
FIG. 15 depicts an example embodiment of a method for determining coefficients for use in chroma enhancement.

FIG. 15 depicts an example embodiment of a method 1500 for determining coefficients for use in chroma enhancement. For example, coefficients for use in a plurality of CEM submatrices may be determined (i.e., $b_p$, $b_m$, $d_p$, $d_m$, $a_p$, $a_m$ and $c_p$, $c_m$). At 1510, select a reference value. In addition, a particular mode may be selected for that reference value. For example, the type of lighting may be specified. At 1520, optimize to find coefficient sets for one or more modes. Thus, in an embodiment such as described above with respect to FIG. 13, CEM coefficients for a plurality of modes may be determined. At 1530, store the optimized coefficients for the one or modes optimized. In general, the optimization techniques described herein may be performed in advance, and coefficients stored in various devices, such as device 100, for performing chroma enhancement when capturing images or retrieving stored images. In one embodiment, optimization is performed offline, to determine the coefficients for the various matrix sets.

Figure 16:
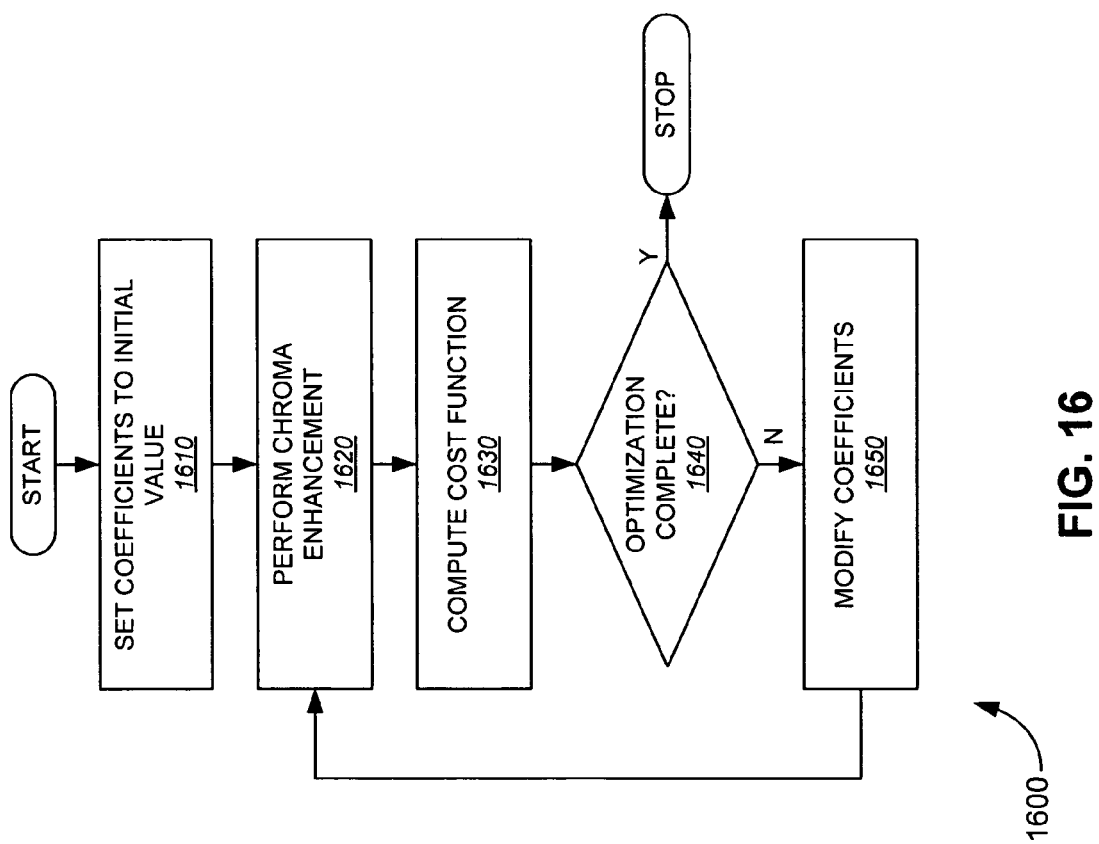
FIG. 16 illustrates an example embodiment of a method for optimizing CEM coefficients.

FIG. 16 illustrates an example embodiment of a method 1600 for optimizing CEM coefficients. The process begins at 1610 where coefficients are set to initial values. At 1620, perform chroma enhancement using the current coefficient values. At 1630, compute a cost function in response to the chroma enhanced value and the standard with which comparison is being made. For example, using a system as shown in FIG. 14, a cost function based on the CIELab values, as converted from the chroma enhancement, will be compared with the standard CIELab value. An example cost function is given in equation 16.

$$f = (1 - W_n)\Delta E + W_n V_n \quad \text{Equation 16}$$

The cost variable, f, is a function of $\Delta E$ and the $V_n$. A weighting parameter, $W_n$, is used to balance the contribution of $\Delta E$ and $V_n$. This grading factor is introduced because of the intrinsic noise found in typical sensor. Sensor noise finds its way through the image processing as well, thus $W_n$ may be selected for more accuracy, i.e. minimizing color differences and/or reduced noise. $\Delta E$, an accuracy measure, is defined in equation 17. $\Delta E$ is defined as the square root of the sum of the squares of the differences between the image process CIELab values and the standard values: $\Delta L^*$, $\Delta a^*$, $\Delta b^*$. $V_n$, a visual noise estimate, known in the art, is given in equation 18. User preferences may be used to determine Wn, i.e. more accuracy (reduced color difference) or reduced noise.

$$\Delta E = \sqrt{\Delta L^{*2} + \Delta a^{*2} + \Delta b^{*2}} \quad \text{Equation 17}$$

$$V_n = s \cdot \sqrt{w_L \sigma_L^2 + w_a \sigma_a^2 + w_b \sigma_b^2} \quad \text{Equation 18}$$

In equation 18, s is a coefficient to adjust the $V_n$ values to be at essentially the same level as $\Delta E$. Variables $w_L$, $w_a$ and $w_b$ are the weights for the three noise components ($\sigma^2_L$, $\sigma^2_a$, and $\sigma^2_b$ and $\Delta L^*$, $\Delta a^*$, and $\Delta b^*$ are the differences between those produced by digital cameras and those perceived by human eyes in CIELab color space.

Returning to FIG. 16, the cost function is computed in 1630. Any number of optimization techniques may be used. For example, Powell's, gradient descent, brute force, or any other technique may be deployed. Weight factors $w_L$, $w_a$, and $w_b$ may be determined from psychophysical tasks. Variances $\sigma^2_L$, $\sigma^2_a$, and $\sigma^2_b$ are the respective variance of the L, a, and b values. In decision block 1640, when the optimization is complete, the process may stop. Otherwise proceed to block 1650 to modify the coefficients, re-perform chroma enhancement, re-compute the cost function, etc, until the desired result has been obtained.

Figure 17:
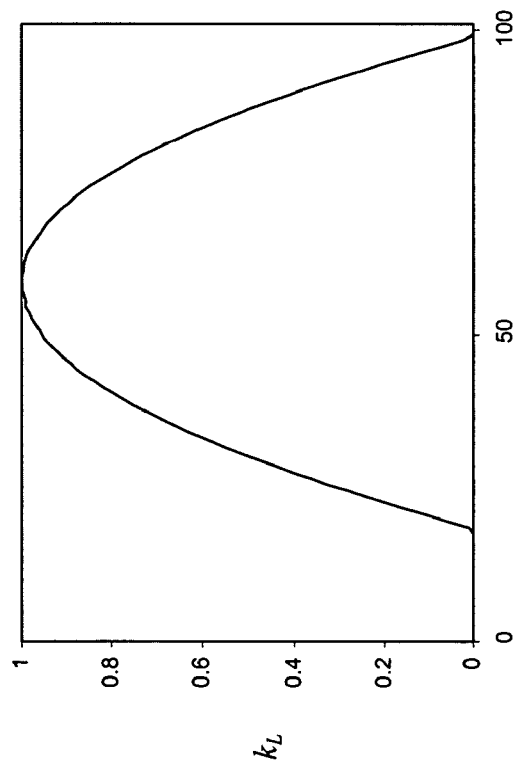
FIG. 17 is an example graph of $K_L$ as a function of L.

An alternate visual noise equation is given by equation 19. Equation 19 is a perceptive noise equation in which $k_L$ and $k_a$ are not just constant values, but are variable according to the sources lightness and chroma values. L is a lightness value, and a and b are chroma values. The parameters shown may be determined using psychophysical experimentation, as well as other techniques. For example, it has been observed that the eye's response to noise or signal varies based on the color or lightness values. In contrast with a metric focused only on standard deviation, the following embodiment provides a metric that is dependent on the lightness of the patch. For example, as illustrated in FIG. 17, the eye is less sensitive to noise when the signal is very bright or very dark. In the center regions of lightness, there is more sensitivity. Thus, lightness intensity may determine the eye's response to noise.

$$V_n = \sqrt{k_{L^*} \cdot \sigma_{L^*}^2 + k_{a^*}\left(\frac{\sigma_{a^*}}{5.76}\right)^2 + \left(\frac{\sigma_{b^*}}{13.65}\right)^2} \quad \text{Equation 19}$$

The relationship of $k_L$ and L is illustrated in FIG. 17. Determining $k_L$ may be performed with a lookup table such as that given in Table 1 below.

TABLE 1

$k_L$ vs. L

| L | $k_L$ | L | $k_L$ | L | $k_L$ | L | $k_L$ |
|---|---|---|---|---|---|---|---|
| 0 | 0 | 25 | 0.324 | 50 | 0.959 | 75 | 0.824 |
| 1 | 0 | 26 | 0.364 | 51 | 0.968 | 76 | 0.803 |
| 2 | 0 | 27 | 0.403 | 52 | 0.976 | 77 | 0.78 |
| 3 | 0 | 28 | 0.441 | 53 | 0.983 | 78 | 0.756 |
| 4 | 0 | 29 | 0.477 | 54 | 0.989 | 79 | 0.731 |
| 5 | 0 | 30 | 0.512 | 55 | 0.993 | 80 | 0.705 |
| 6 | 0 | 31 | 0.546 | 56 | 0.996 | 81 | 0.678 |
| 7 | 0 | 32 | 0.579 | 57 | 0.999 | 82 | 0.649 |
| 8 | 0 | 33 | 0.611 | 58 | 0.999 | 83 | 0.619 |
| 9 | 0 | 34 | 0.641 | 59 | 0.999 | 84 | 0.588 |
| 10 | 0 | 35 | 0.67 | 60 | 0.997 | 85 | 0.555 |
| 11 | 0 | 36 | 0.698 | 61 | 0.994 | 86 | 0.522 |
| 12 | 0 | 37 | 0.724 | 62 | 0.99 | 87 | 0.487 |
| 13 | 0 | 38 | 0.75 | 63 | 0.985 | 88 | 0.451 |
| 14 | 0 | 39 | 0.774 | 64 | 0.978 | 89 | 0.413 |
| 15 | 0 | 40 | 0.797 | 65 | 0.97 | 90 | 0.375 |
| 16 | 0 | 41 | 0.819 | 66 | 0.961 | 91 | 0.335 |
| 17 | 0 | 42 | 0.839 | 67 | 0.951 | 92 | 0.294 |
| 18 | 0.008 | 43 | 0.858 | 68 | 0.939 | 93 | 0.251 |
| 19 | 0.057 | 44 | 0.876 | 69 | 0.927 | 94 | 0.208 |
| 20 | 0.105 | 45 | 0.893 | 70 | 0.913 | 95 | 0.163 |
| 21 | 0.151 | 46 | 0.909 | 71 | 0.897 | 96 | 0.117 |
| 22 | 0.196 | 47 | 0.923 | 72 | 0.881 | 97 | 0.07 |
| 23 | 0.24 | 48 | 0.936 | 73 | 0.863 | 98 | 0.021 |
| 24 | 0.282 | 49 | 0.948 | 74 | 0.844 | 99 | 0 |
|  |  |  |  |  |  | 100 | 0 |

Figure 18:
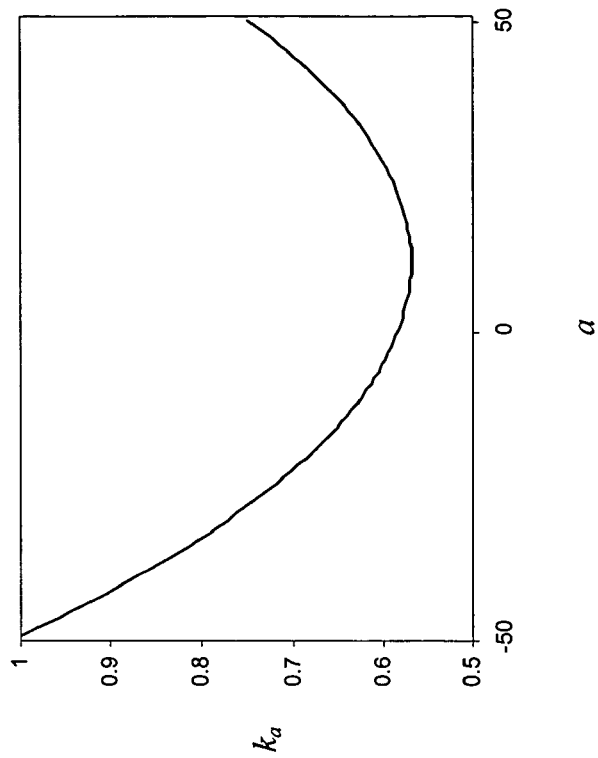

The relationship of $k_a$ to a is represented in FIG. 18. This function may also be formed using a lookup table, such as given in Table 2 below.

TABLE 2

$k_a$ vs. a

| a | $k_a$ | a | $k_a$ | a | $k_a$ | a | $k_a$ |
|---|---|---|---|---|---|---|---|
| −50 | 1 | −25 | 0.718 | 0 | 0.582 | 25 | 0.592 |
| −49 | 0.986 | −24 | 0.71 | 1 | 0.58 | 26 | 0.596 |
| −48 | 0.972 | −23 | 0.702 | 2 | 0.578 | 27 | 0.6 |
| −47 | 0.958 | −22 | 0.694 | 3 | 0.576 | 28 | 0.604 |
| −46 | 0.945 | −21 | 0.686 | 4 | 0.574 | 29 | 0.608 |
| −45 | 0.932 | −20 | 0.679 | 5 | 0.573 | 30 | 0.612 |
| −44 | 0.919 | −19 | 0.672 | 6 | 0.571 | 31 | 0.617 |
| −43 | 0.906 | −18 | 0.665 | 7 | 0.57 | 32 | 0.622 |
| −42 | 0.894 | −17 | 0.659 | 8 | 0.57 | 33 | 0.627 |
| −41 | 0.882 | −16 | 0.652 | 9 | 0.569 | 34 | 0.632 |
| −40 | 0.87 | −15 | 0.646 | 10 | 0.569 | 35 | 0.638 |

TABLE 2-continued $k_a$ vs. a

| a | $k_a$ | a | $k_a$ | a | $k_a$ | a | $k_a$ |
|---|---|---|---|---|---|---|---|
| −39 | 0.858 | −14 | 0.64 | 11 | 0.569 | 36 | 0.643 |
| −38 | 0.846 | −13 | 0.635 | 12 | 0.569 | 37 | 0.649 |
| −37 | 0.835 | −12 | 0.629 | 13 | 0.569 | 38 | 0.656 |
| −36 | 0.824 | −11 | 0.624 | 14 | 0.57 | 39 | 0.662 |
| −35 | 0.813 | −10 | 0.619 | 15 | 0.571 | 40 | 0.669 |
| −34 | 0.803 | −9 | 0.614 | 16 | 0.572 | 41 | 0.676 |
| −33 | 0.792 | −8 | 0.61 | 17 | 0.573 | 42 | 0.683 |
| −32 | 0.782 | −7 | 0.605 | 18 | 0.575 | 43 | 0.69 |
| −31 | 0.772 | −6 | 0.601 | 19 | 0.577 | 44 | 0.698 |
| −30 | 0.763 | −5 | 0.598 | 20 | 0.579 | 45 | 0.706 |
| −29 | 0.753 | −4 | 0.594 | 21 | 0.581 | 46 | 0.714 |
| −28 | 0.744 | −3 | 0.591 | 22 | 0.584 | 47 | 0.722 |
| −27 | 0.735 | −2 | 0.588 | 23 | 0.586 | 48 | 0.731 |
| −26 | 0.726 | −1 | 0.585 | 24 | 0.589 | 49 | 0.74 |
|  |  |  |  |  |  | 50 | 0.749 |

Note that various other functions may be substituted for those shown in Tables 1 and 2. For example, any function determined from psychophysical experiments may be substituted. For example, in alternate embodiments, the curves shown in FIG. 17 or 18 may be replaced by stepwise linear functions, which may include more or less variation. The shape of the curves may be altered, as well as the location of the peaks or rolloff parameters. The examples shown are illustrative only.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for chroma enhancement, comprising:
   means for generating a plurality of matrices;
   means for chroma enhancement of a color in accordance with one of the plurality of matrices selected in response to the color;
   means for computing a cost function as a function of the chroma enhanced color and a target value; and
   means for modifying one or more of the plurality of matrices in response to the computed cost function.

2. The apparatus of claim 1, wherein the means for generating a plurality of matrices comprises a memory for storing the plurality of matrices.

3. The apparatus of claim 1, wherein the means for chroma enhancement comprises a matrix multiplier for multiplying the color by a second matrix comprising the selected one of the plurality of matrices.

4. The apparatus of claim 1, wherein the plurality of matrices generated are pre-computed.

5. The apparatus of claim 1, wherein the chroma enhancement of the color enhances memory colors.

6. The apparatus of claim 1 further comprising a means for optimizing the plurality of matrices generated.

7. The apparatus of claim 6 further comprising a means for selecting a mode, wherein the means for optimizing the plurality of matrices generated is in accordance with the selected mode.

8. The apparatus of claim 1, wherein computing the cost function comprises an accuracy measure.

9. The apparatus of claim 8, wherein the chroma enhanced color and the target value are computed in the CIELab format, including a respective L*, a* and b* value for the chroma enhanced color and the target value, ΔL*, Δa*, and Δb* are their respective differences, and the accuracy measure is computed as $\Delta E = \sqrt{\Delta L^{*2} + \Delta a^{*2} + \Delta b^{*2}}$.

10. The apparatus of claim 1, wherein computing the cost function comprises a noise measure.

11. The apparatus of claim 10, wherein the chroma enhanced color and the target value are computed in the CIELab format, including a respective L*, a* and b* value for the chroma enhanced color and target value, ΔL*, Δa*, and Δb* are their respective differences, $\sigma^2_L$, $\sigma^2_a$, and $\sigma^2_b$ are their respective variances, s is a coefficient to adjust the level of the noise measure, $w_L$, $w_a$ and $w_b$ are respective weighting parameters, and the noise measure is computed as $V_n = s \cdot \sqrt{w_L \sigma_L^2 + w_a \sigma_a^2 + w_b \sigma_b^2}$.

12. The apparatus of claim 11, wherein the chroma enhanced color and target value are computed in the CIELab format, including a respective L*, a* and b* value for the chroma enhanced color and target value, ΔL*, Δa*, and Δb* are their respective differences, $\sigma^2_{L^*}$, $\sigma^2_{a^*}$, and $\sigma^2_{b^*}$ are their respective variances, $k_{L^*}$ is a weighting parameter for lightness, $k_{a^*}$ is a weighting parameter for chroma, and the noise measure is computed as $$V_n = \sqrt{k_{L^*} \cdot \sigma_{L^*}^2 + k_{a^*} \left(\frac{\sigma_{a^*}}{5.76}\right)^2 + \left(\frac{\sigma_{b^*}}{13.65}\right)^2}.$$

13. The apparatus of claim 11, wherein the noise measure is computed with a weighting factor applied to lightness.

14. The apparatus of claim 13, wherein the weighting factor for lightness is decreased for lightness above a predetermined threshold.

15. The apparatus of claim 13, wherein the weighting factor for lightness is decreased for lightness below a predetermined threshold.

16. An apparatus for chroma enhancement comprising:
   a module configured to generate a plurality of matrices;
   a module configured to perform chroma enhancement of a color in accordance with one of the plurality of matrices selected in response to the color;
   a module configured to compute a cost function as a function of the chroma enhanced color and a target value; and
   a module configured to modify one or more of the plurality of matrices in response to the computed cost function.

17. The apparatus of claim 16, wherein the module configured to generate a plurality of matrices comprises a memory for storing the plurality of matrices.

18. The apparatus of claim 16, wherein the module configured to perform chroma enhancement comprises a matrix multiplier for multiplying the color by a second matrix comprising the selected one of the plurality of matrices.

19. The apparatus of claim 16, wherein the plurality of matrices generated are pre-computed.

20. The apparatus of claim 16 further comprising a module configured to optimize the plurality of matrices generated.

21. The apparatus of claim 20 further comprising a module configured to select a mode, wherein optimize the plurality of matrices generated is in accordance with the selected mode.

22. The apparatus of claim 16, wherein the module configured to compute the cost function comprises an accuracy measure.

23. The apparatus of claim 22, wherein the chroma enhanced color and the target value are computed in the CIELab format, including a respective L*, a* and b* value for the chroma enhanced color and the target value, ΔL*, Δa*, and Δb* are their respective differences, and the accuracy measure is computed as $\Delta E = \sqrt{\Delta L^{*2} + \Delta a^{*2} + \Delta b^{*2}}$.

24. The apparatus of claim 16, wherein computing the cost function comprises a noise measure.

25. The apparatus of claim 24, wherein the chroma enhanced color and the target value are computed in the CIELab format, including a respective L*, a* and b* value for the chroma enhanced color and target value, ΔL*, Δa*, and Δb* are their respective differences, $\sigma^2_L$, $\sigma^2_a$, and $\sigma^2_b$ are their respective variances, s is a coefficient to adjust the level of the noise measure, $w_L$, $w_a$ and $w_b$ are respective weighting parameters, and the noise measure is computed as $V_n = s \cdot \sqrt{w_L \sigma_L^2 + w_a \sigma_n^2 + w_b \sigma_b^2}$.

26. The apparatus of claim 25, wherein the chroma enhanced color and target value are computed in the CIELab format, including a respective L*, a* and b* value for the chroma enhanced color and target value, ΔL*, Δa*, and Δb* are their respective differences, $\sigma^2_{L*}$, $\sigma^2_{a*}$, and $\sigma^2_{b*}$ are their respective variances, $k_{L*}$ is a weighting parameter for lightness, $k_{a*}$ is a weighting parameter for chroma, and the noise measure is computed as $$V_n = \sqrt{k_{L^*}\sigma^2_{L^*} + k_{a^*}\left(\frac{\sigma_{a^*}}{5.76}\right)^2 + \left(\frac{\sigma_{b^*}}{13.65}\right)^2}.$$

27. The apparatus of claim 25, wherein the noise measure is computed with a weighting factor applied to lightness.

28. The apparatus of claim 27, wherein the weighting factor for lightness is decreased for lightness above a predetermined threshold.

29. The apparatus of claim 27, wherein the weighting factor for lightness is decreased for lightness below a predetermined threshold.

30. A method for performing chroma enhancement, comprising:
generating a plurality of matrices;
enhancing the chroma of a color in accordance with one of the plurality of matrices selected in response to the color;
computing a cost function as a function of the chroma enhanced color and a target value; and
modifying one or more of the plurality of matrices in response to the computed cost function.

31. The method of claim 30, wherein generating a plurality of matrices comprises a memory for storing the plurality of matrices.

32. The method of claim 30, wherein enhancing the chroma of a color comprises a matrix multiplier for multiplying the color by a second matrix comprising the selected one of the plurality of matrices.

33. The method of claim 30, wherein the plurality of matrices generated are pre-computed.

34. The method of claim 30, further comprising optimizing the plurality of matrices generated.

35. The method of claim 34, further comprising selecting a mode, wherein optimizing the plurality of matrices generated is in accordance with the selected mode.

36. The method of claim 30, wherein computing the cost function comprises an accuracy measure.

37. The method of claim 36, wherein the chroma enhanced color and the target value are computed in the CIELab format, including a respective L*, a* and b* value for the chroma enhanced color and the target value, ΔL*, Δa*, and Δb* are their respective differences, and the accuracy measure is computed as $\Delta E = \sqrt{\Delta L^{*2} + \Delta a^{*2} + \Delta b^{*2}}$.

38. The method of claim 30, wherein computing the cost function comprises a noise measure.

39. The method of claim 38, wherein the chroma enhanced color and the target value are computed in the CIELab format, including a respective L*, a* and b* value for the chroma enhanced color and target value, ΔL*, Δa*, and Δb* are their respective differences, $\sigma^2_L$, $\sigma^2_a$, and $\sigma^2_b$ are their respective variances, s is a coefficient to adjust the level of the noise measure, $w_L$, $w_a$ and $w_b$ are respective weighting parameters, and the noise measure is computed as $V_n = s \cdot \sqrt{w_L \sigma_L^2 + w_a \sigma_a^2 + w_b \sigma_b^2}$.

40. The method of claim 39, wherein the chroma enhanced color and target value are computed in the CIELab format, including a respective L*, a* and b* value for the chroma enhanced color and target value, ΔL*, Δa*, and Δb* are their respective differences, $\sigma^2_{L*}$, $\sigma^{a}_{*}$, and $\sigma^2_{b*}$ are their respective variances, $k_{L*}$ is a weighting parameter for lightness, $k_{a*}$ is a weighting parameter for chroma, and the noise measure is computed as $$V_n = \sqrt{k_{L^*}\sigma^2_{L^*} + k_{a^*}\left(\frac{\sigma_{a^*}}{5.76}\right)^2 + \left(\frac{\sigma_{b^*}}{13.65}\right)^2}.$$

41. The method of claim 39, wherein the noise measure is computed with a weighting factor applied to lightness.

42. The method of claim 41, wherein the weighting factor for lightness is decreased for lightness above a predetermined threshold.

43. The method of claim 41, wherein the weighting factor for lightness is decreased for lightness below a predetermined threshold.

44. A computer-readable medium for performing chroma enhancement, the computer-readable medium comprising instructions that when executed cause a programmable processor to perform a method of:
generating a plurality of matrices;
enhancing the chroma of a color in accordance with one of the plurality of matrices selected in response to the color;
computing a cost function as a function of the chroma enhanced color and a target value; and
modifying one or more of the plurality of matrices in response to the computed cost function.

45. The computer-readable medium of claim 44, wherein generating a plurality of matrices comprises a memory for storing the plurality of matrices.

46. The computer-readable medium of claim 44, wherein enhancing the chroma of a color comprises a matrix multiplier for multiplying the color by a second matrix comprising the selected one of the plurality of matrices.

47. The computer-readable medium of claim 44, wherein the plurality of matrices generated are pre-computed.

48. The computer-readable medium of claim 44, further comprising optimizing the plurality of matrices generated.

49. The computer-readable medium of claim 48, further comprising selecting a mode, wherein optimizing the plurality of matrices generated is in accordance with the selected mode.

50. The computer-readable medium of claim 44, wherein computing the cost function comprises an accuracy measure.

51. The computer-readable medium of claim 50, wherein the chroma enhanced color and the target value are computed in the CIELab format, including a respective L*, a* and b* value for the chroma enhanced color and the target value, $\Delta L^*$, $\Delta a^*$, and $\Delta b^*$ are their respective differences, and the accuracy measure is computed as $\Delta E = \sqrt{\Delta L^{*2} + \Delta a^{*2} + \Delta b^{*2}}$.

52. The computer-readable medium of claim 44, wherein computing the cost function comprises a noise measure.

53. The computer-readable medium of claim 52, wherein the chroma enhanced color and the target value are computed in the CIELab format, including a respective L*, a* and b* value for the chroma enhanced color and target value, $\Delta L^*$, $\Delta a^*$, and $\Delta b^*$ are their respective differences, $\sigma^2_L$, $\sigma^2_a$, and $\sigma^2_b$ are their respective variances, s is a coefficient to adjust the level of the noise measure, $w_L$, $w_a$ and $w_b$ are respective weighting parameters, and the noise measure is computed as $V_n = s \cdot \sqrt{w_L \sigma_L^2 + w_a \sigma_a^2 + w_b \sigma_b^2}$.

54. The computer-readable medium of claim 53, wherein the chroma enhanced color and target value are computed in the CIELab format, including a respective L*, a* and b* value for the chroma enhanced color and target value, $\Delta L^*$, $\Delta a^*$, and $\Delta b^*$ are their respective differences, $\sigma^2_{L^*}$, $\sigma^2_{a^*}$, and $\sigma^2_{b^*}$ are their respective variances, $k_{L^*}$ is a weighting parameter for lightness, $k_{a^*}$ is a weighting parameter for chroma, and the noise measure is computed as $$V_n = \sqrt{k_{L^*} \sigma^2_{L^*} + k_{a^*} \left(\frac{\sigma_{a^*}}{5.76}\right)^2 + \left(\frac{\sigma_{b^*}}{13.65}\right)^2}.$$

55. The computer-readable medium of claim 53, wherein the noise measure is computed with a weighting factor applied to lightness.

56. The computer-readable medium of claim 55, wherein the weighting factor for lightness is decreased for lightness above a predetermined threshold.

57. The computer-readable medium of claim 55, wherein the weighting factor for lightness is decreased for lightness below a predetermined threshold.

* * * * *

UNITED STATES PATENT AND TRADEMARK OFFICE
CERTIFICATE OF CORRECTION

| | | |
|---|---|---|
| PATENT NO. | : 7,724,949 B2 | Page 1 of 1 |
| APPLICATION NO. | : 11/136979 | |
| DATED | : May 25, 2010 | |
| INVENTOR(S) | : Chiu et al. | |

It is certified that error appears in the above-identified patent and that said Letters Patent is hereby corrected as shown below:

Title page, line 3, item [75] inventor name: "Chinchuan Andrew Chiu" to read as --Andrew Chinchuan Chiu--

Signed and Sealed this
Fifth Day of July, 2011

David J. Kappos
*Director of the United States Patent and Trademark Office*